(12) United States Patent
Ueda et al.

(10) Patent No.: US 11,485,584 B2
(45) Date of Patent: Nov. 1, 2022

(54) TIRE CONVEYING APPARATUS, TIRE INSPECTION SYSTEM PROVIDED WITH SAME, AND TIRE CONVEYING METHOD

(71) Applicant: MITSUBISHI HEAVY INDUSTRIES MACHINERY SYSTEMS, LTD., Kobe (JP)

(72) Inventors: Tatsuya Ueda, Hiroshima (JP); Morihiro Imamura, Hiroshima (JP); Makoto Tachibana, Hiroshima (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 466 days.

(21) Appl. No.: 16/619,712

(22) PCT Filed: Jun. 6, 2017

(86) PCT No.: PCT/JP2017/020965
§ 371 (c)(1),
(2) Date: Dec. 5, 2019

(87) PCT Pub. No.: WO2018/225150
PCT Pub. Date: Dec. 13, 2018

(65) Prior Publication Data
US 2020/0180869 A1      Jun. 11, 2020

(51) Int. Cl.
*B65G 43/08* (2006.01)
*B65G 47/22* (2006.01)
*G01M 17/02* (2006.01)

(52) U.S. Cl.
CPC ............. *B65G 43/08* (2013.01); *B65G 47/22* (2013.01); *G01M 17/021* (2013.01); *B65G 2201/0273* (2013.01); *B65G 2203/0233* (2013.01)

(58) Field of Classification Search
CPC .. G01M 17/02; G01M 17/022; G01M 17/021; B60C 19/00; B65G 43/08; B65G 47/22; B65G 2203/0233; B65G 2201/0273
See application file for complete search history.

(56) References Cited

U.S. PATENT DOCUMENTS

| 5,992,227 A | 11/1999 | Jellison et al. |
| 6,082,191 A | 7/2000 | Neiferd et al. |

(Continued)

FOREIGN PATENT DOCUMENTS

| CN | 1096967 C | 12/2002 |
| CN | 103347667 A | 10/2013 |

(Continued)

OTHER PUBLICATIONS

PCT/ISA/210, "International Search Report for International Application No. PCT/JP2017/020965," dated Aug. 15, 2017.

(Continued)

*Primary Examiner* — James R Bidwell
(74) *Attorney, Agent, or Firm* — Manabu Kanesaka; Benjamin Hauptman; Kenneth Berner

(57) ABSTRACT

A tire conveying apparatus includes a conveyor for conveying a tire, a position sensor, and a controller for controlling the conveyor. The controller includes a determination unit which determines whether or not the tire is positioned within an allowable area for a reference area set in a conveyance path of the conveyor, based on a detection result of the position sensor, and a center conveyor control unit which drives the conveyor such that the tire is positioned within the allowable area, if a determination that the tire is not positioned within the allowable area is made.

12 Claims, 14 Drawing Sheets

(56) References Cited

U.S. PATENT DOCUMENTS

| | | | |
|---|---|---|---|
| 10,458,883 B2* | 10/2019 | Boffa | G01M 17/022 |
| 2011/0203362 A1 | 8/2011 | Imamura et al. | |
| 2013/0233066 A1 | 9/2013 | Wakazono et al. | |
| 2013/0251832 A1 | 9/2013 | Agawa | |
| 2013/0333615 A1 | 12/2013 | Wakazono et al. | |
| 2014/0230534 A1 | 8/2014 | Tachibana et al. | |
| 2014/0251757 A1 | 9/2014 | Wakazono et al. | |
| 2014/0270466 A1* | 9/2014 | Dam | G01N 21/88 |
| | | | 382/141 |
| 2016/0129736 A1* | 5/2016 | Peine | G01B 7/30 |
| | | | 701/32.3 |
| 2016/0189390 A1 | 6/2016 | Hayashi | |
| 2016/0252431 A1 | 9/2016 | Tachibana et al. | |
| 2017/0003198 A1 | 1/2017 | Imamura et al. | |

FOREIGN PATENT DOCUMENTS

| | | | |
|---|---|---|---|
| CN | 103842791 A | 6/2014 | |
| CN | 204173520 U | 2/2015 | |
| CN | 105742208 A | 7/2016 | |
| CN | 106164642 A | 11/2016 | |
| CN | 106739849 A | 5/2017 | |
| DE | 102014203596 A1 | 9/2014 | |
| EP | 2696188 B1 | 8/2016 | |
| EP | 2856075 B1 | 5/2018 | |
| JP | S62-218345 A | 9/1987 | |
| JP | 2001-512566 A | 8/2001 | |
| JP | 2007-279057 A | 10/2007 | |
| JP | 2008-297092 A | 12/2008 | |
| JP | 2012-145503 A | 8/2012 | |
| JP | 2013-214569 A | 10/2013 | |
| JP | 5357081 B2 | 12/2013 | |
| JP | 2014-157960 A | 8/2014 | |
| JP | 5916954 B2 | 5/2016 | |
| TW | 201538356 A | 10/2015 | |
| WO | 2012/137416 A1 | 10/2012 | |
| WO | 2015/155883 A1 | 10/2015 | |
| WO | 2016/135839 A1 | 9/2016 | |

OTHER PUBLICATIONS

PCT/ISA/237, "Written Opinion of the International Searching Authority for International Application No. PCT/JP2017/020965," dated Aug. 15, 2017.

* cited by examiner

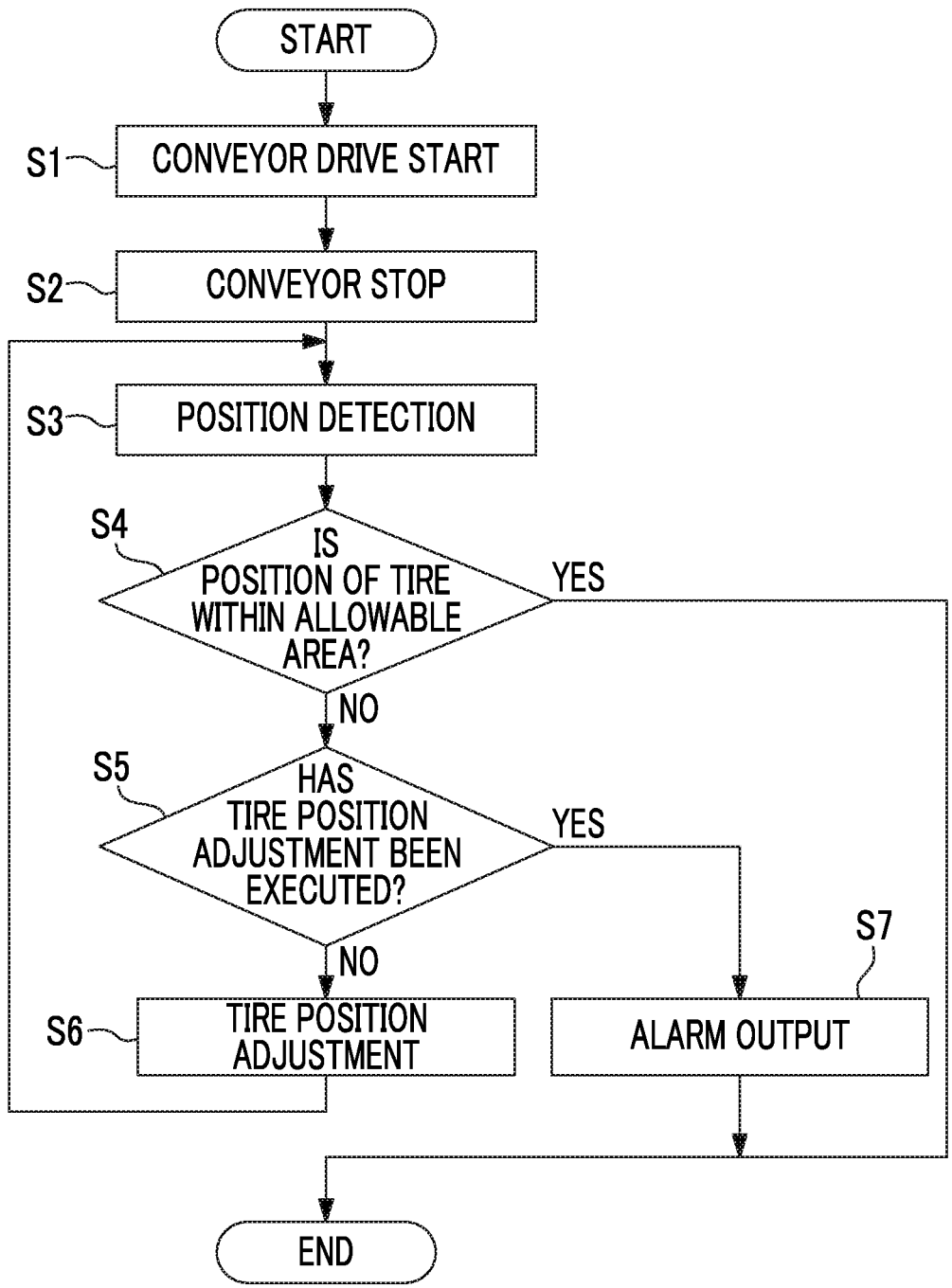

FIG. 9

| UPSTREAM-SIDE FIRST SENSOR | UPSTREAM-SIDE SECOND SENSOR | DOWNSTREAM-SIDE FIRST SENSOR | DOWNSTREAM-SIDE SECOND SENSOR | DETERMINATION RESULT | POSITION ADJUSTMENT |
|---|---|---|---|---|---|
| ABSENCE | ABSENCE | ABSENCE | ABSENCE | WITHIN ALLOWABLE AREA | NO POSITION ADJUSTMENT |
| PRESENCE | ABSENCE | ABSENCE | ABSENCE | UPSTREAM-SIDE PORTION IS OUTSIDE ALLOWABLE RANGE | SLIGHT CONVEYANCE TOWARD DOWNSTREAM SIDE |
| ABSENCE | PRESENCE | ABSENCE | ABSENCE | UPSTREAM-SIDE PORTION IS OUTSIDE ALLOWABLE RANGE | SLIGHT CONVEYANCE TOWARD DOWNSTREAM SIDE |
| PRESENCE | PRESENCE | ABSENCE | ABSENCE | UPSTREAM-SIDE PORTION IS OUTSIDE ALLOWABLE RANGE | SLIGHT CONVEYANCE TOWARD DOWNSTREAM SIDE |
| ABSENCE | ABSENCE | PRESENCE | ABSENCE | DOWNSTREAM-SIDE PORTION IS OUTSIDE ALLOWABLE RANGE | SLIGHT CONVEYANCE TOWARD UPSTREAM SIDE |
| ABSENCE | ABSENCE | ABSENCE | PRESENCE | DOWNSTREAM-SIDE PORTION IS OUTSIDE ALLOWABLE RANGE | SLIGHT CONVEYANCE TOWARD UPSTREAM SIDE |
| ABSENCE | ABSENCE | PRESENCE | PRESENCE | DOWNSTREAM-SIDE PORTION IS OUTSIDE ALLOWABLE RANGE | SLIGHT CONVEYANCE TOWARD UPSTREAM SIDE |

FIG. 10

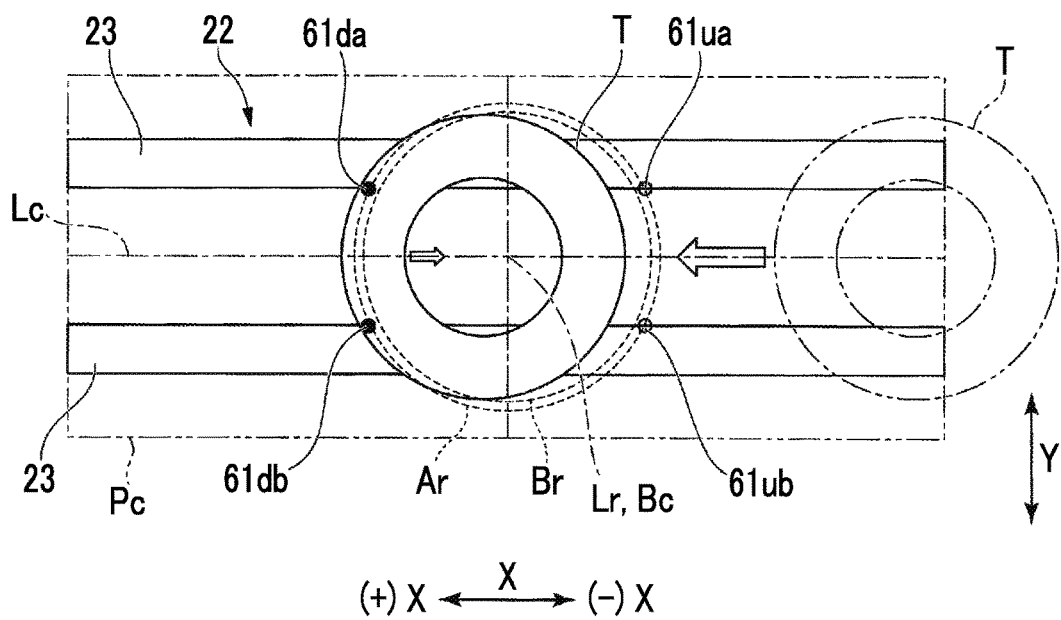

FIG. 12
(a)
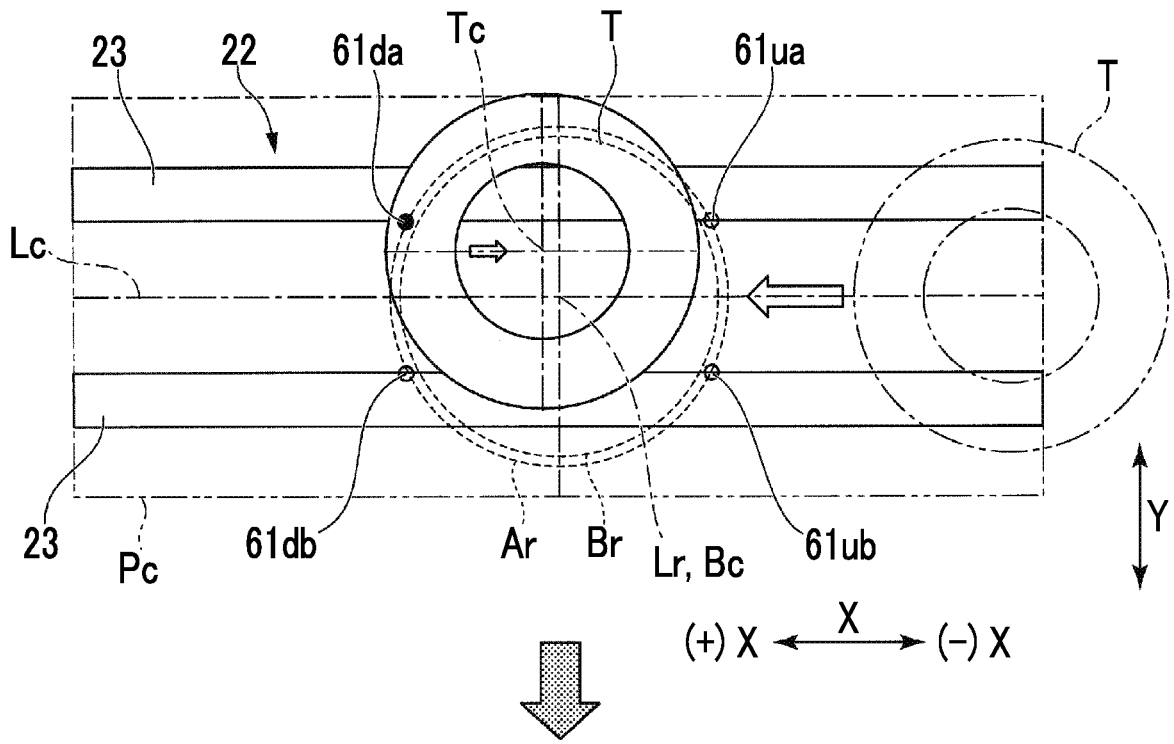
(b)
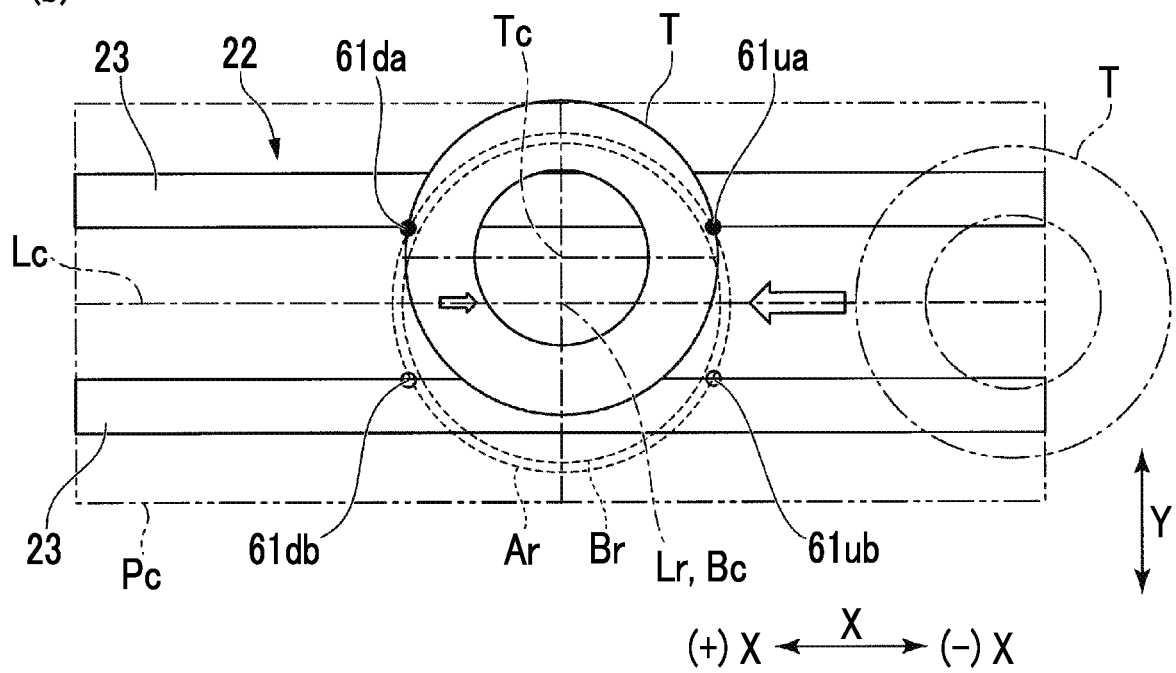

TIRE CONVEYING APPARATUS, TIRE INSPECTION SYSTEM PROVIDED WITH SAME, AND TIRE CONVEYING METHOD

RELATED APPLICATIONS

The present application is National Phase of International Application No. PCT/JP2017/020965 filed Jun. 6, 2017, the disclosure of which is hereby incorporated by reference herein in its entirety.

TECHNICAL FIELD

The present invention relates to a tire conveying apparatus which conveys a tire in a predetermined conveying direction, a tire inspection system which is provided with the tire conveying apparatus, and a tire conveying method.

BACKGROUND ART

In a case of manufacturing rubber tires which are used for vehicles or the like, in order to guarantee the quality of the tire, various inspections are performed on the tire in a state where the tire is pseudo-inflated (air-inflated) by an inspection device. In this type of tire inspection system, after a tire is conveyed to an inspection position by using a belt conveyor, the tire is held by clamping a bead portion of the tire by an upper rim and a lower rim disposed at the inspection position. Then, various inspections are performed on the tire in a state where the tire is held.

In the above tire inspection system, when the tire is held with the upper rim and the lower rim, it is necessary for the tire to be correctly positioned at the inspection position.

Therefore, PTL 1 discloses a method of correctly positioning a tire at an inspection position by driving a pair of guides at a stage where the tire reaches a position at which it is assumed that the tire has been conveyed to the inspection position by a belt conveyor.

Further, PTL 2 discloses a method in which an inclination of a tire with respect to a horizontal direction is detected by a sensor in a state where a bead portion of the tire is in contact with a lower rim, and in a case where the inclination exceeds an allowable range, an alarm indicating abnormality is output.

CITATION LIST

Patent Literature

[PTL 1] Japanese Patent No. 5916954
[PTL 2] Pamphlet of International Publication No. WO2016/135839

SUMMARY OF INVENTION

Technical Problem

In the method described in PTL 1, the pair of guides and a device for driving the respective guides are required, and thus there is a problem in that the manufacturing cost of an inspection system is increased.

Further, in the method described in PTL 2, there is a problem in that it is not possible to adjust the tire to an intended position.

Therefore, the present invention has an object to provide a tire conveying apparatus in which it is possible to adjust the position of a tire while suppressing the apparatus cost, a tire inspection system which is provided with the tire conveying apparatus, and a tire conveying method.

Solution to Problem

According to a first aspect of the invention for achieving the above object, there is provided a tire conveying apparatus including: a conveyor on which a tire that is in a state where both side walls thereof face a vertical direction is placed, and which is capable of conveying the tire in a predetermined tire conveying direction; a position sensor which is provided around a reference area set in a conveyance path of the conveyor and detects a position of the tire on the conveyor; and a controller which controls the conveyor. The controller includes a determination unit which determines whether or not the tire is positioned within an allowable area for the reference area, based on a detection result of the position sensor, and a conveyor control unit which drives the conveyor if the determination unit determines that the tire is not positioned within the allowable area.

In the tire conveying apparatus, by driving the conveyor, it is possible to adjust the position of the tire on the conveyor.

In a tire conveying apparatus according to a second aspect of the invention for achieving the above object, in the tire conveying apparatus according to the first aspect, the conveyor control unit drives the conveyor such that the tire is positioned within the allowable area.

In the tire conveying apparatus, by driving the conveyor, it is possible to position the tire on the conveyor within the allowable area.

In a tire conveying apparatus according to a third aspect of the invention for achieving the above object, in the tire conveying apparatus according to the first or second aspect, the reference area is a circular area having an outer shape matching an outer diameter of the tire, and the allowable area is a circular area having an outer diameter larger than the outer diameter of the tire and having a reference center that is a center of the reference area as a center. The position sensor includes an upstream-side position sensor which detects whether or not the tire is present at a position of an edge of the allowable area on the upstream side in the tire conveying direction from the reference center, and a downstream-side position sensor which detects whether or not the tire is present at a position of an edge of the allowable area on the downstream side in the tire conveying direction from the reference center. The determination unit determines that the tire is positioned within the allowable area, if absence of the tire is detected by the upstream-side position sensor and the downstream-side position sensor, and determines that the tire is not positioned within the allowable area, if any one of the upstream-side position sensor or the downstream-side position sensor detects presence of the tire.

In the tire conveying apparatus, whether the tire has deviated toward the upstream side or the downstream side from the allowable area can be detected by the position sensor. For this reason, in the tire conveying apparatus, by driving the conveyor in accordance with the detection result by the position sensor, it is possible to eliminate the deviation of the tire in the tire conveying direction from the allowable area.

In a tire conveying apparatus according to a fourth aspect of the invention for achieving the above object, in the tire conveying apparatus according to the third aspect, the upstream-side position sensor includes a first upstream-side position sensor which detects whether or not the tire is present at an upstream-side first position of the edge of the allowable area on the upstream side in the tire conveying direction from the reference center, and a second upstream-side position sensor which detects whether or not the tire is present at an upstream-side second position of the edge of the allowable area on the upstream side in the tire conveying direction from the reference center. The upstream-side second position is different from the upstream-side first position in position in a path width direction of the conveyance path. The downstream-side position sensor includes a first downstream-side position sensor which detects whether or not the tire is present at a downstream-side first position of the edge of the allowable area on the downstream side in the tire conveying direction from the reference center, and a second downstream-side position sensor which detects whether or not the tire is present at a downstream-side second position of the edge of the allowable area on the downstream side in the tire conveying direction from the reference center. The downstream-side second position is different from the downstream-side first position in position in the path width direction.

In the tire conveying apparatus, whether or not the tire has deviated from the allowable area in the path width direction can be detected by the position sensor.

In a tire conveying apparatus according to a fifth aspect of the invention for achieving the above object, in the tire conveying apparatus according to the fourth aspect, the upstream-side first position and the downstream-side first position are present on a first side in the path width direction from the reference center. Further, the upstream-side second position and the downstream-side second position are present on a second side opposite to the first side in the path width direction from the reference center.

In the tire conveying apparatus, whether the tire has deviated toward the first side in the path width direction or the second side in the path width direction from the allowable area can be detected by the position sensor.

In a tire conveying apparatus according to a sixth aspect of the invention for achieving the above object, the tire conveying apparatus according to any one of the third to fifth aspects further includes: an inlet conveyor which is disposed on the upstream side in the tire conveying direction from the conveyor, and on which a tire that is in a state where both side walls thereof face a vertical direction is placed, and which conveys the tire toward the downstream side in the tire conveying direction to transfer the tire to the conveyor; and a centering mechanism which causes the center of the tire placed on the inlet conveyor to be positioned on a path center line passing through the reference center and extending in the tire conveying direction. The controller includes an inlet conveyor control unit which controls an operation of the inlet conveyor, and a centering control unit which controls an operation of the centering mechanism. The conveyor control unit causes the conveyor to convey the tire toward the upstream side in the tire conveying direction to transfer the tire to the inlet conveyor, if the determination unit determines that the tire is not positioned within the allowable area, after completion of a tire position adjustment step of driving the conveyor with an instruction from the conveyor control unit. The inlet conveyor control unit causes the inlet conveyor to convey the tire toward the upstream side in the tire conveying direction to an adjustable position where the position of the tire can be adjusted by the centering mechanism, if the tire moves from the conveyor to the inlet conveyor. The centering control unit causes the centering mechanism to position the center of the tire on the path center line, if the tire reaches the adjustable position by the inlet conveyor.

In the tire conveying apparatus, even in a case where the tire has deviated from the allowable area in the path width direction, the deviation can be eliminated.

In a tire conveying apparatus according to a seventh aspect of the invention for achieving the above object, in the tire conveying apparatus according to any one of the first to fifth aspects, the controller includes an alarm output unit which outputs an alarm to the effect that a tire position is defective, if the determination unit determines that the tire is not positioned within the allowable area, after completion of a tire position adjustment step of driving the conveyor with an instruction from the conveyor control unit.

In the tire conveying apparatus, even after the tire position adjustment step is completed, in a case where the tire is not positioned within the allowable area, it is possible to notify an operator that the tire position is defective.

According to an eighth aspect of the invention for achieving the above object, there is provided a tire inspection system including: the tire conveying apparatus which is provided with the upstream-side position sensor and the downstream-side position sensor; and an inspection device which holds the tire which has been conveyed into the allowable area and performs an inspection on the tire. The inspection device includes a plurality of tire strippers which are disposed on an axis passing through the reference center and extending in a vertical direction and move the tire in the vertical direction relative to a rim fitted in a bead portion of the tire, and a stripper moving mechanism which moves the plurality of tire strippers in a radial direction with respect to the axis. The upstream-side position sensor is mounted on any one tire stripper among the plurality of tire strippers, and the downstream-side position sensor is mounted on any other tire stripper among the plurality of tire strippers. The controller includes a stripper movement control unit which controls an operation of the stripper moving mechanism. The stripper movement control unit determines an outer diameter of the allowable area according to an outer diameter of the tire that is an inspection object, and causes a tire stripper with the upstream-side position sensor mounted thereon and a tire stripper with the downstream-side position sensor mounted thereon to be positioned at positions where the upstream-side position sensor and the downstream-side position sensor can detect whether or not the tire is present at a position of an edge of the allowable area.

In the tire inspection system, even in tires having different outer diameters, it is possible to detect whether or not the tire has deviated from an allowable area corresponding to the tire.

According to a ninth aspect of the invention for achieving the above object, there is provided a tire conveying method of placing a tire that is in a state where both side walls thereof face a vertical direction and conveying the tire in a predetermined tire conveying direction with a conveyor, the tire conveying method including: a position detection step of detecting a position of the tire on the conveyor at a position where it is assumed that the tire has been conveyed to a reference area set in a conveyance path of the conveyor by the conveyor; a position determination step of determining whether or not the tire is positioned within an allowable area for the reference area, based on a detection result in the position detection step; and a tire position adjustment step of adjusting the position of the tire by driving the conveyor, if a determination that the tire is not positioned within the allowable area is made in the position determination step.

In the tire conveying method, by driving the conveyor, it is possible to adjust the position of the tire on the conveyor.

In a tire conveying method according to a tenth aspect of the invention for achieving the above object, in the tire conveying method according to the ninth aspect, in the tire position adjustment step, the position of the tire is adjusted by driving the conveyor such that the tire is positioned within the allowable area.

In the tire conveying method, by driving the conveyor, it is possible to position the tire on the conveyor within the allowable area.

In a tire conveying method according to an eleventh aspect of the invention for achieving the above object, in the tire conveying method according to the ninth or tenth aspect, the position detection step and the position determination step are executed after execution of the tire position adjustment step, and an alarm output step of outputting an alarm to the effect that a tire position is defective is executed if a determination that the tire is not positioned within the allowable area is made in the position determination step after the tire position adjustment step.

In the tire conveying method, even after the tire position adjustment step is completed, in a case where the tire is not positioned within the allowable area, it is possible to notify an operator that the tire position is defective.

In a tire conveying method according to a twelfth aspect of the invention for achieving the above object, in the tire conveying method according to the ninth or tenth aspect, the position detection step and the position determination step are executed after execution of the tire position adjustment step, and a reverse rotation drive step of driving the conveyor in reverse rotation to convey the tire on the conveyor toward the upstream side is executed if a determination that the tire is not positioned within the allowable area is made in the position determination step after the tire position adjustment step.

In the tire conveying method, even after the tire position adjustment step is completed, in a case where the tire is not positioned within the allowable area, it is possible to return the tire toward the upstream side. In a case where a device for adjusting the position of the tire in the path width direction is present on the upstream side of the conveyor, it is possible to adjust the position of the tire in the path width direction with this device.

Advantageous Effects of Invention

According to an aspect of the present invention, it is possible to adjust the position of the tire while suppressing the apparatus cost.

BRIEF DESCRIPTION OF DRAWINGS

FIG. 8 is a flowchart showing details of a conveying method in the first embodiment of the present invention.

FIG. 9 is an explanatory diagram showing detection results by the respective sensors, determination results based on these detection results, and position adjustment contents based on the determination results in the first embodiment of the present invention.

FIG. 10 is an explanatory diagram showing a position adjustment method in a case where a tire deviates from the allowable area toward the upstream side in the first embodiment of the present invention.

(a) of FIG. 12 is an explanatory diagram showing the position adjustment method in a case where the tire deviates toward the upstream side and greatly deviates in the path width direction from the allowable area in the first embodiment of the present invention, and (b) of FIG. 12 is an explanatory diagram showing the result of the position adjustment.

Figure 13:
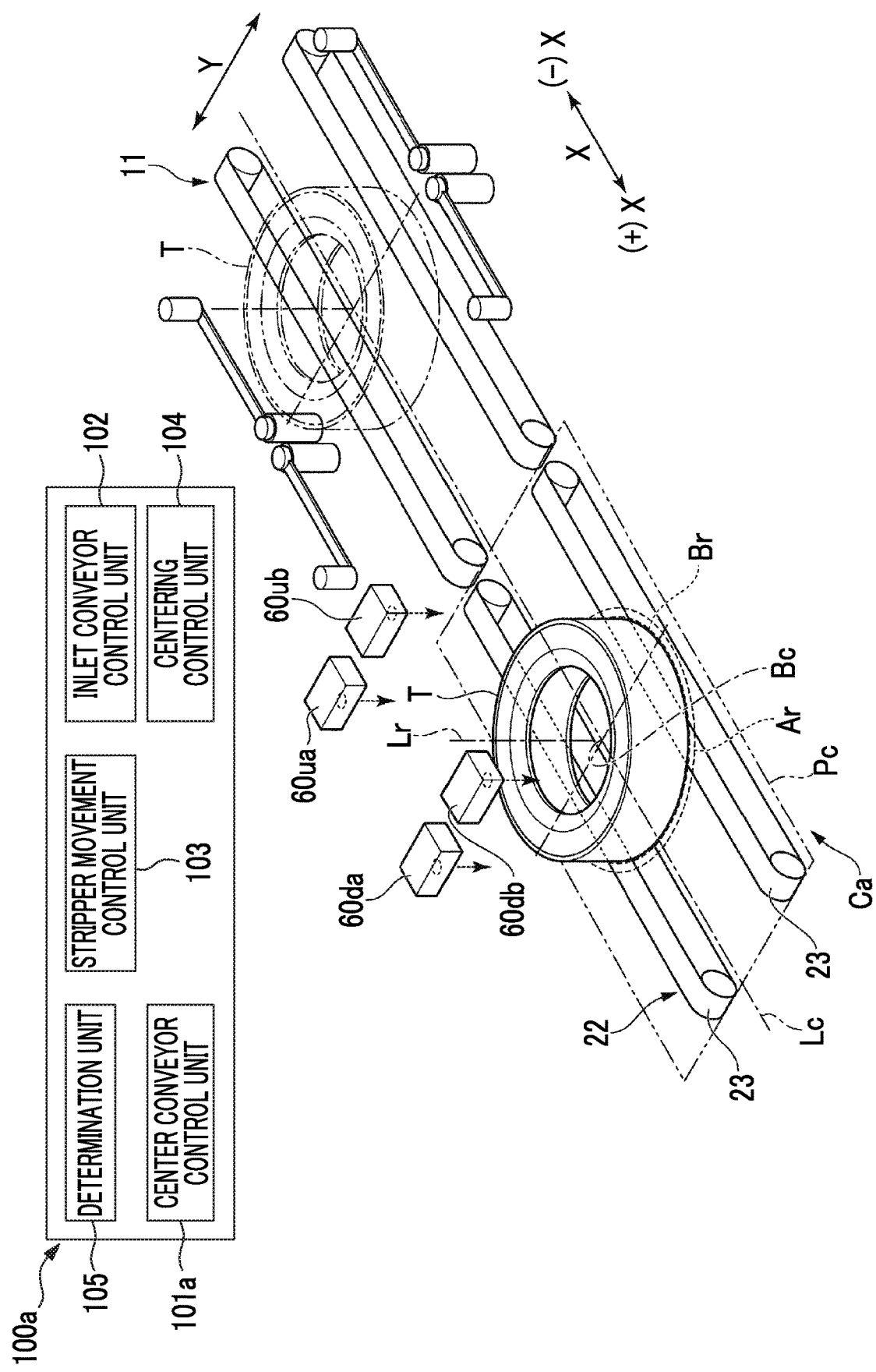

FIG. 13 is a conceptual diagram showing a configuration of a conveying apparatus in a second embodiment of the present invention.

Figure 14:
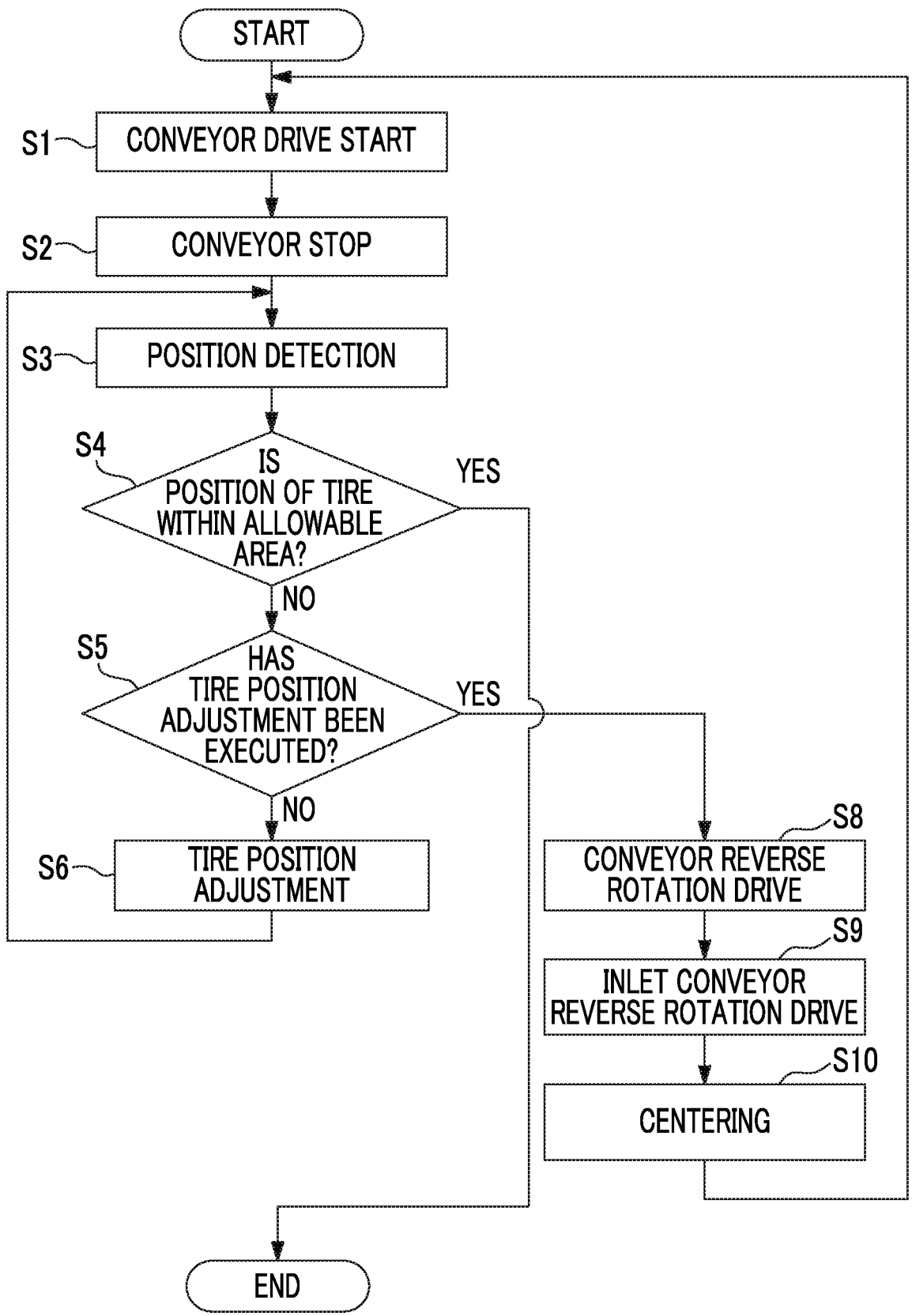

FIG. 14 is a flowchart showing details of a conveying method in the second embodiment of the present invention.

Figure 15:
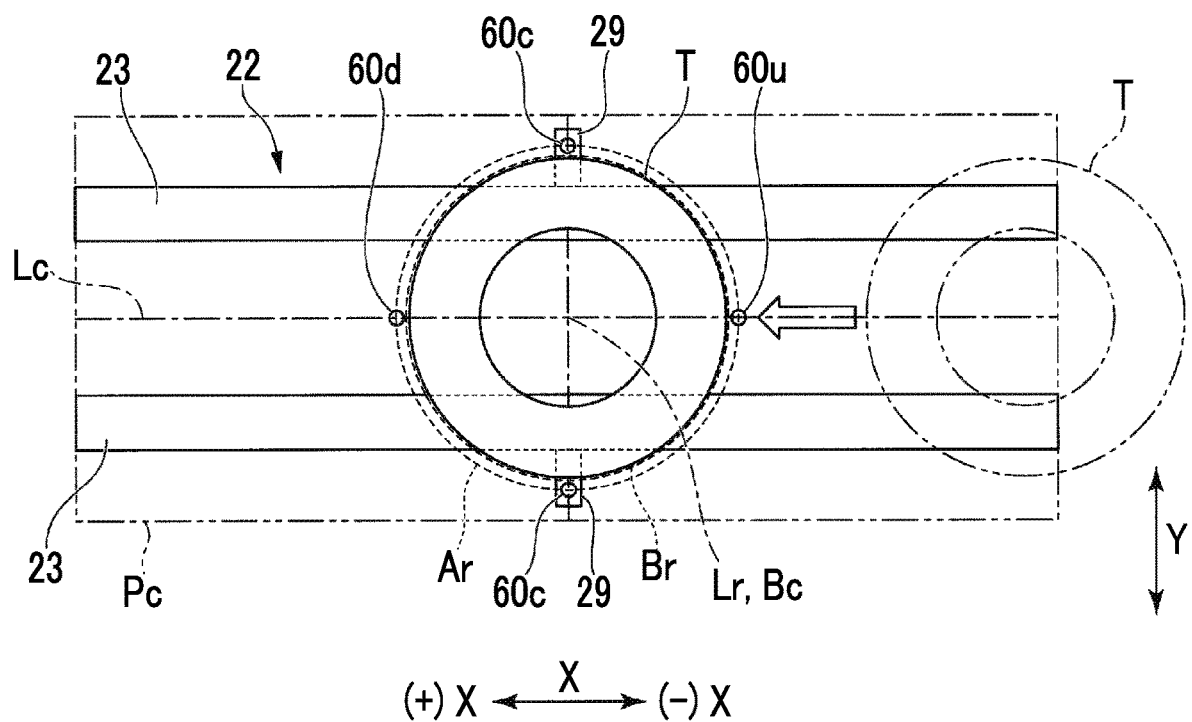

FIG. 15 is an explanatory diagram showing a modification example of the disposition of the position sensor in the first embodiment of the present invention.

DESCRIPTION OF EMBODIMENTS

Hereinafter, various embodiments of a tire inspection system according to the present invention will be described with reference to the drawings.

First Embodiment

A first embodiment of the tire inspection system according to the present invention will be described with reference to FIGS. 1 to 12.

Figure 1:
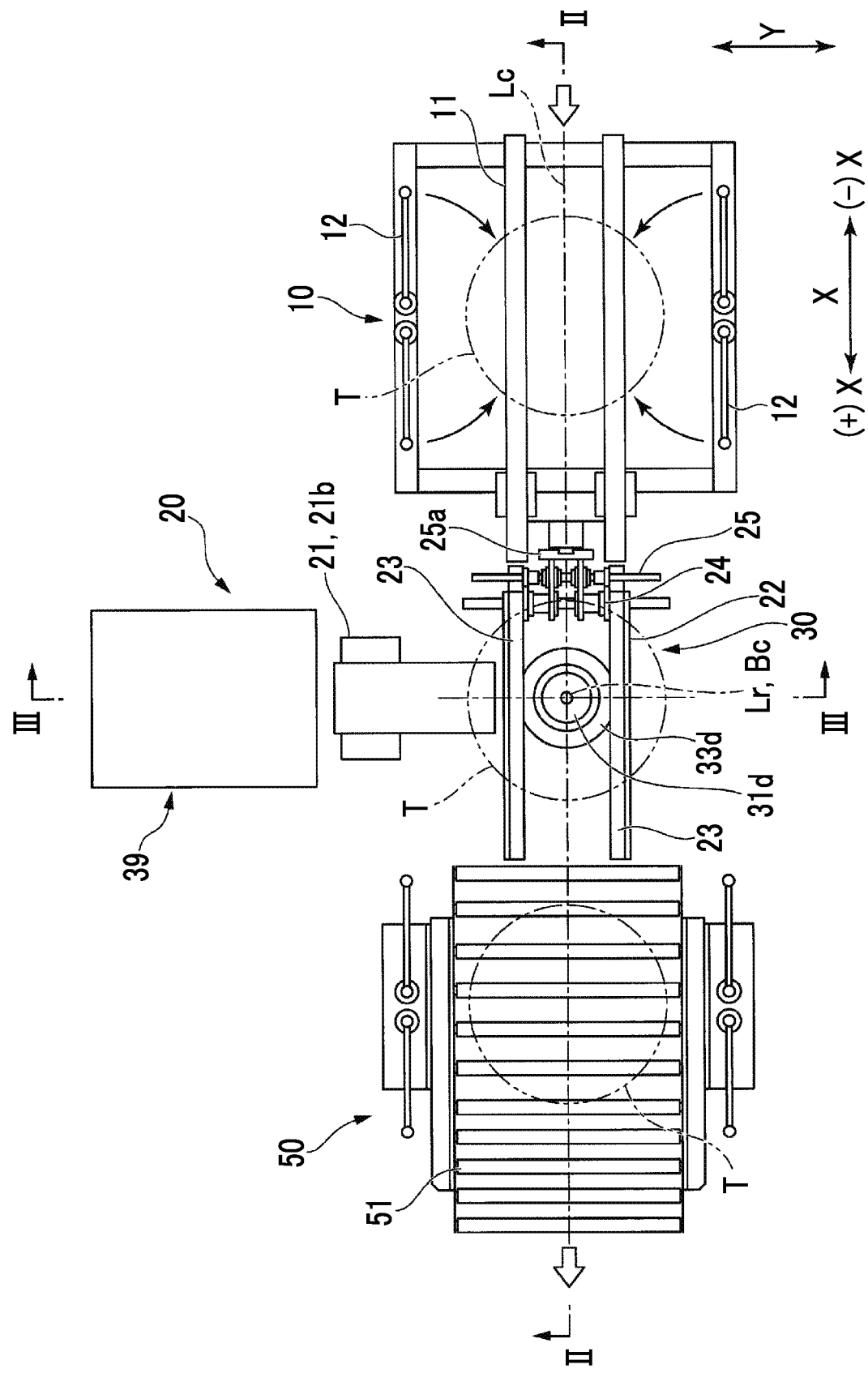
FIG. 1 is a plan view of a tire inspection system in a first embodiment of the present invention.
Figure 2:
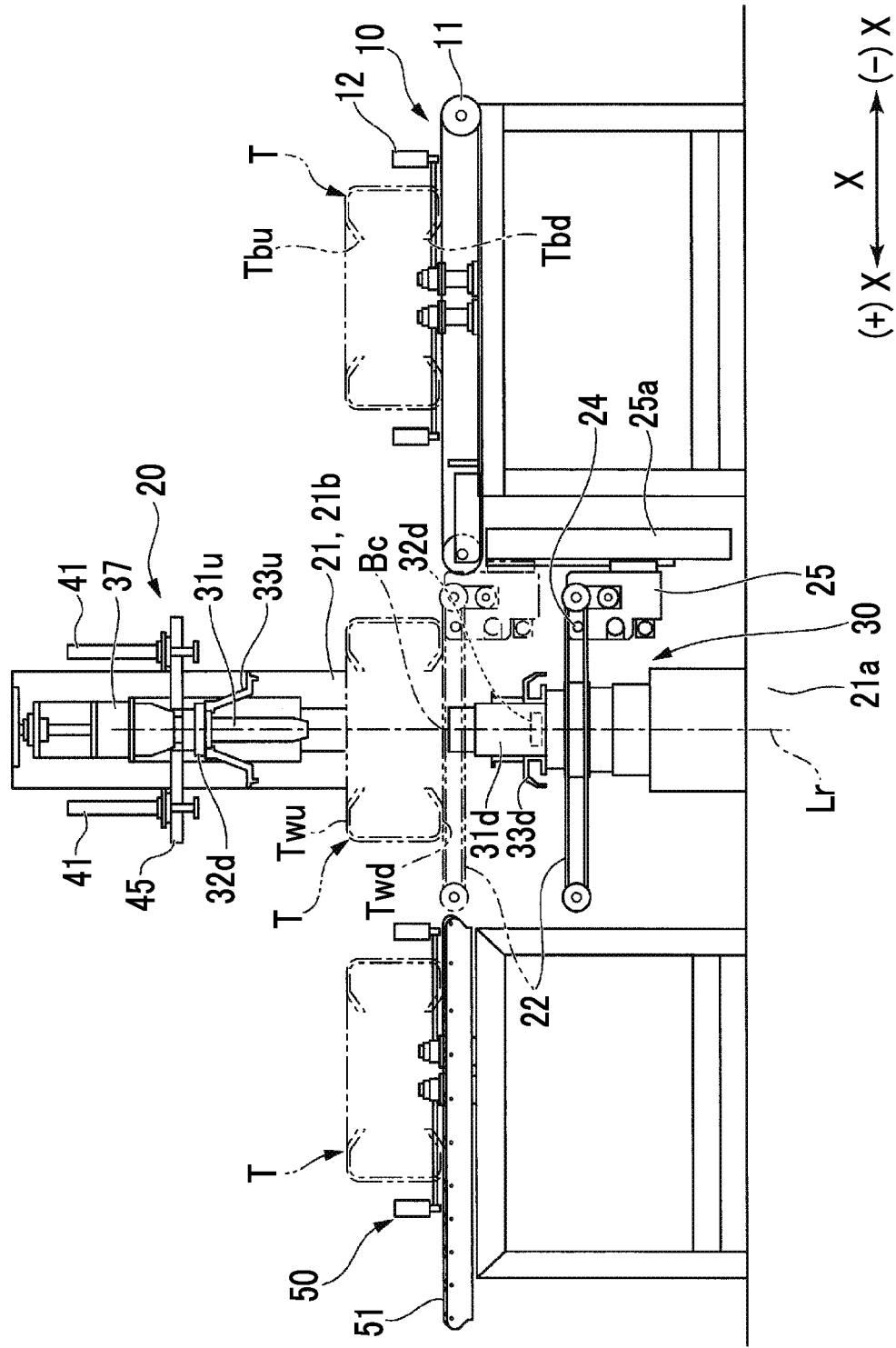
FIG. 2 is a sectional view taken along line II-II in FIG. 1.
Figure 3:
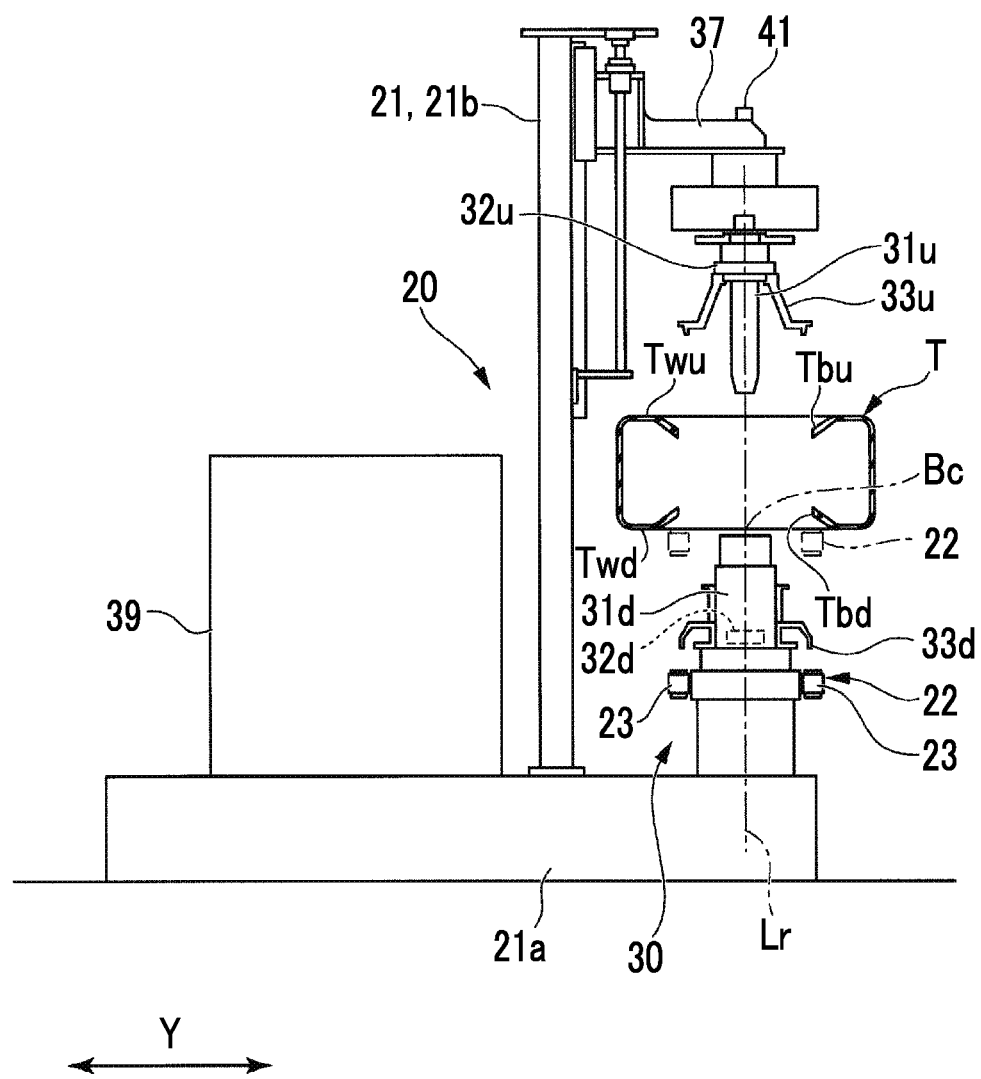
FIG. 3 is a sectional view taken along line III-III in FIG. 1.

As shown in FIGS. 1 to 3, the tire inspection system of this embodiment is provided with a pre-treatment device which performs pre-treatment on a tire T that is an inspection object, an inspection device 20 which performs various inspections on the tire T, a post-treatment device 50 which performs post-treatment on the tire T subjected to the inspection, and a controller 100 (refer to FIG. 6) which controls the operations of the devices 10, 20, and 50.

The pre-treatment device 10 is provided with an inlet conveyor 11, a centering mechanism 12, and a lubricant application mechanism (not shown). The inlet conveyor 11 conveys the tire T in a predetermined direction. Hereinafter, this direction is referred to as a tire conveying direction X. Further, one side in the tire conveying direction X is referred to as a downstream side (+)X, and the side opposite to the downstream side (+)X is referred to as an upstream side (−)X. The tire T that is in a state where both side walls Twu and Twd face a vertical direction is placed on the inlet conveyor 11. The inlet conveyor 11 conveys the tire T placed thereon from the upstream side (−)X to the downstream side (+)X.

The centering mechanism 12 positions the center of the tire T at a predetermined position of an inlet conveyance path on the inlet conveyor 11. The predetermined position is the center in a path width direction Y of the inlet conveyance path. Accordingly, the centering mechanism 12 centers the tire T. The lubricant application mechanism (not shown) applies a lubricant to an upper bead portion Tbu and a lower bead portion Tbd of the tire T which has been centered.

The inspection device 20 is provided with a tire holder 30, a tire measuring instrument 39, and a frame 21 which supports the tire holder 30 and the tire measuring instrument 39. The tire holder 30 rotatably holds the tire T. The tire holder 30 is provided with a center conveyor 22. The center conveyor 22 is disposed on the downstream side (+)X of the inlet conveyor 11 and conveys the tire T in the same direction as the tire conveying direction X of the inlet conveyor 11. Accordingly, the path width direction Y of a center conveyance path of the center conveyor 22 is also the same direction as the path width direction Y of the inlet conveyance path. The tire measuring instrument 39 performs various measurements relating to the tire T held by the tire holder 30.

The post-treatment device 50 is provided with an outlet conveyor 51 and a marking mechanism (not shown). The outlet conveyor 51 is disposed on the downstream side (+)X of the center conveyor 22 and conveys the tire T in the same direction as the tire conveying direction X in the inlet conveyor 11 and the center conveyor 22. Accordingly, the path width direction Y of an outlet conveyance path of the outlet conveyor 51 is also the same direction as the path width direction Y in the inlet conveyance path and the center conveyance path. The level in the vertical direction of the outlet conveyance path is the same as the level in the vertical direction of the inlet conveyance path.

As shown in FIGS. 2 and 3, the tire holder 30 in the inspection device 20 is provided with, in addition to the center conveyor 22 described above, an upper spindle 31u, an upper rim chuck mechanism 32u, a lower spindle 31d, a lower rim chuck mechanism 32d, a rim elevator 37, a conveyor elevating device 25, two tire strippers 41, and a stripper moving mechanism 45.

Each of the upper spindle 31u and the lower spindle 31d is a columnar member centered on an axis of rotation Lr extending in the vertical direction. The lower spindle 31d is rotationally driven around the axis of rotation Lr on a base 21a of the frame 21. The lower rim chuck mechanism 32d holds a lower rim 33d which is fitted in the lower bead portion Tbd of the tire T. The lower rim 33d is held by the lower rim chuck mechanism 32d, thereby entering a state of being mounted on the lower spindle 31d. The upper rim chuck mechanism 32u holds an upper rim 33u which is fitted in the upper bead portion Tbu of the tire T. The upper rim 33u is held by the upper rim chuck mechanism 32u, thereby entering a state of being mounted on the upper spindle 31u.

The tire stripper 41 and the stripper moving mechanism 45 will be described later.

The rim elevator 37 is supported on a main frame 21b of the frame 21 so as to be movable in the vertical direction, through guide means 37a such as a linear guide. The upper spindle 31u described above is supported on the rim elevator 37.

The rim elevator 37 moves up and down in a state where the axis of rotation Lr of the upper spindle 31u coincides with the axis of rotation Lr of the lower spindle 31d. If the rim elevator 37 moves down, a lower portion of the upper spindle 31u is inserted into the lower spindle 31d. The upper spindle 31u is combined with the lower spindle 31d at a predetermined insertion position by a locking mechanism (not shown) provided in the lower spindle 31d. If the upper spindle 31u is combined with the lower spindle 31d by the locking mechanism, the upper spindle 31u rotates integrally with the lower spindle 31d according to the rotation of the lower spindle 31d.

The center conveyor 22 described above is supported on the main frame 21b through guide means 25a such as a linear guide so as to be movable in the vertical direction. The center conveyor 22 moves up and down in the vertical direction between an upper limit position and a lower limit position by the conveyor elevating device 25 having a servomotor (not shown). The upper limit position of the center conveyor 22 is a position at which the level of the upper surface of the center conveyor 22, in other words, the level of the center conveyance path, becomes the same level as the levels of the inlet conveyance path and the outlet conveyance path, as shown by an imaginary line in FIGS. 2 and 3. The lower limit position of the center conveyor 22 is a position at which the level of the upper surface of the center conveyor 22 is lower than the lower rim 33d mounted on the lower spindle 31d, as shown by a solid line in FIGS. 2 and 3.

When the center conveyance path of the center conveyor 22 is positioned at the upper limit position, an imaginary line passing through the axis of rotation Lr of the upper spindle 31u and the lower spindle 31d and extending in the tire conveying direction X on the center conveyance path is a path center line Lc. The centering mechanism 12 of the pre-treatment device 10 positions the center of the tire T on the path center line Lc.

The center conveyor 22 has a pair of belts 23 separated from each other by a predetermined distance in the path width direction Y. The belt 23 on one side and the belt 23 on the other side of the pair of belts 23 are disposed at positions which are symmetrical in the path width direction Y with the path center line Lc passing through the axis of rotation Lr as the reference. The distance between the pair of belts 23 in the path width direction Y can be adjusted by a belt opening and closing mechanism 24 which is known. For this reason, the lower spindle 31d and the lower rim 33d can pass between the pair of belts 23 when the center conveyor 22 moves up and down.

Both the two tire strippers 41 described above move the tire T fitted in the upper rim 33u in the vertical direction relative to the upper rim 33u, thereby removing the tire T from the upper rim 33u. The stripper moving mechanism 45 moves each of the two tire strippers 41 in a radial direction with respect to the axis of rotation Lr described above.

Figure 4:
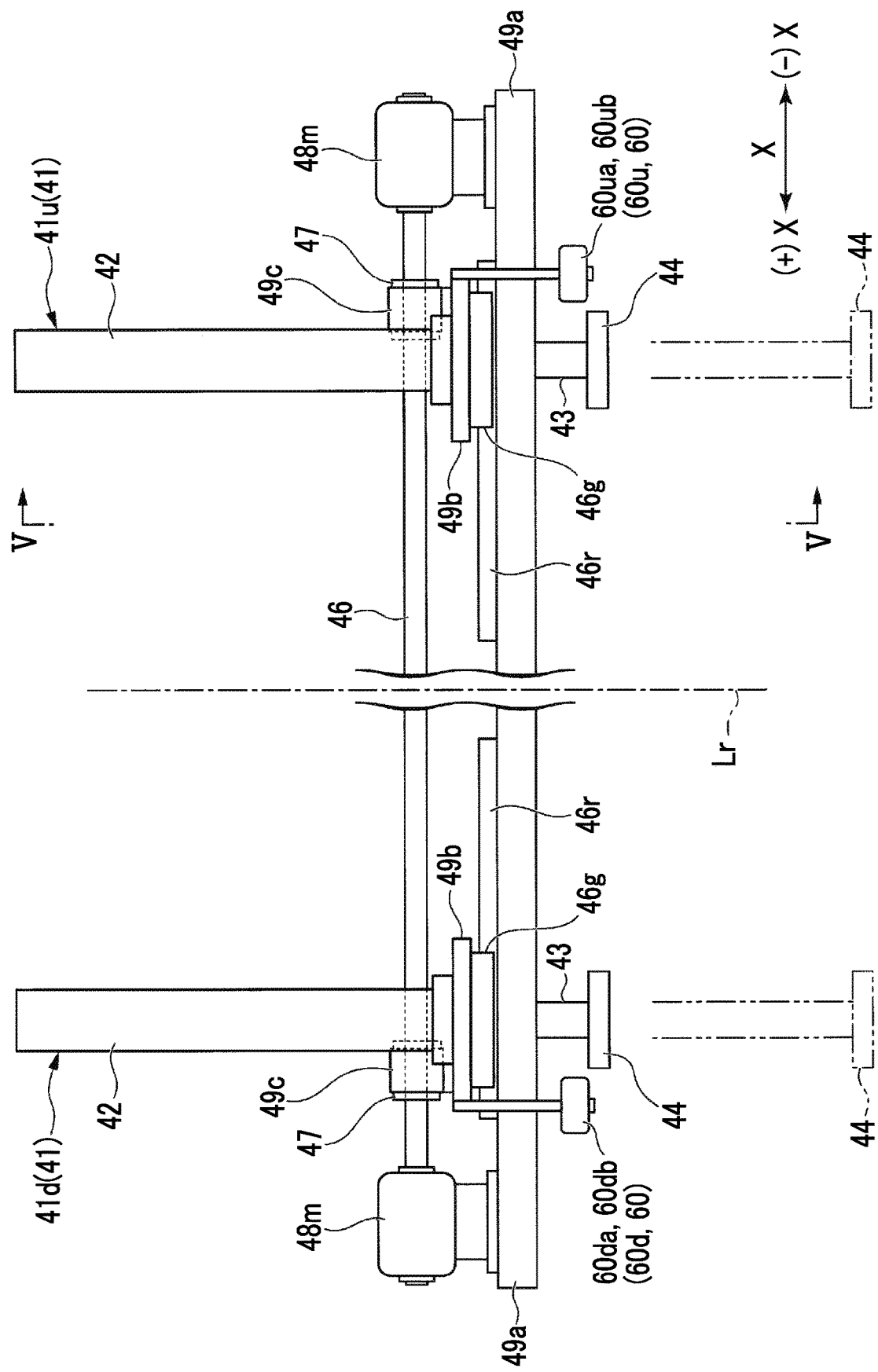
FIG. 4 is a front view of a tire stripper and a stripper moving mechanism in the first embodiment of the present invention.
Figure 5:
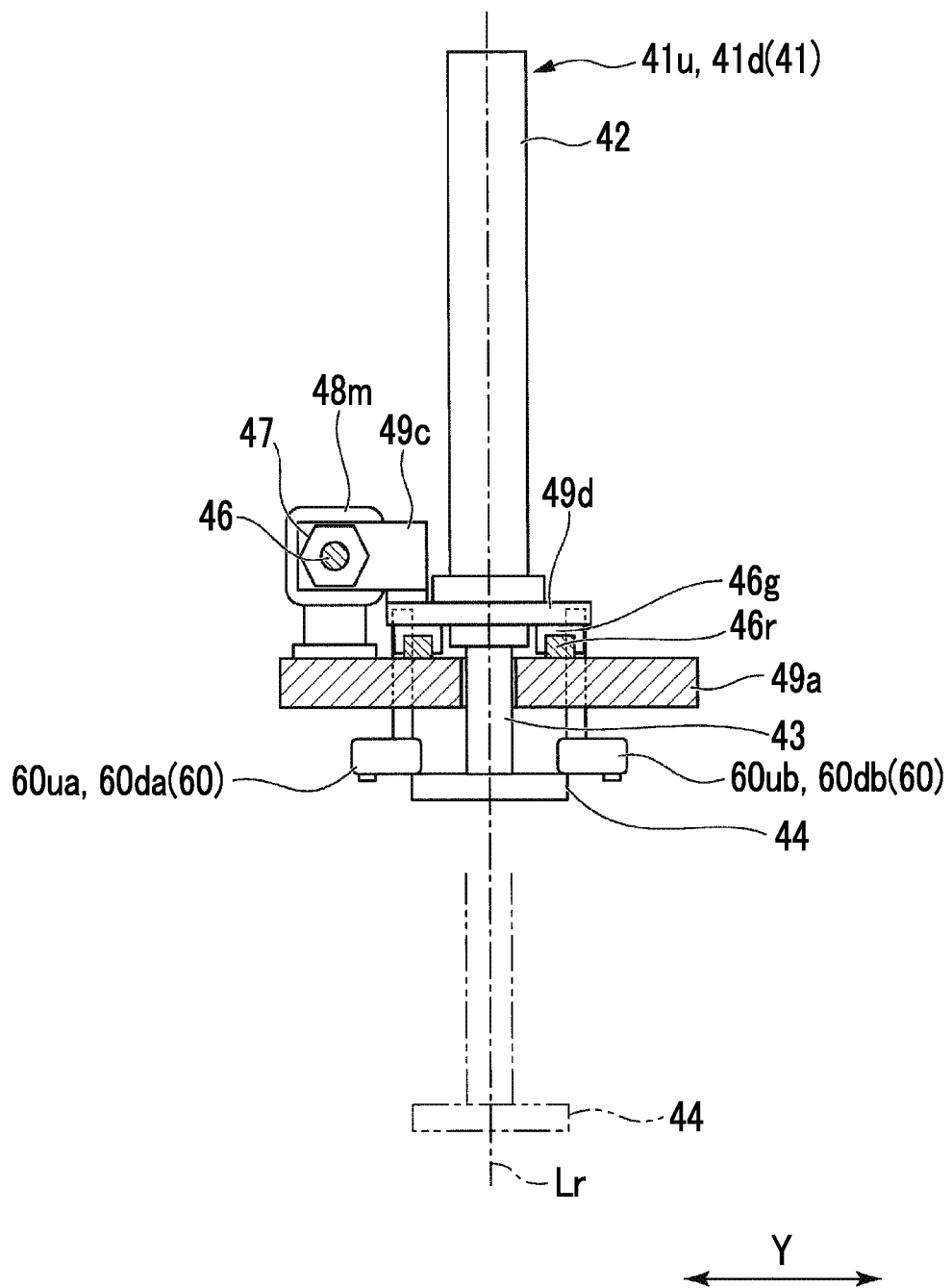
FIG. 5 is a sectional view taken along line V-V in FIG. 4.

In this embodiment, the tire stripper 41 is an air cylinder. The tire stripper 41 has a cylinder case 42 and a piston rod 43, as shown in FIGS. 4 and 5. A piston (not shown) is fixed to a base end of the piston rod 43. The base end of the piston rod 43 and the piston are contained in the cylinder case 42. A pressing plate 44 is fixed to the tip of the piston rod 43. The tip of the piston rod 43 and the pressing plate 44 are exposed from the cylinder case 42. If air having a predetermined pressure is supplied into the cylinder case 42, the piston rod 43 and the pressing plate 44 move together with the piston. The pressing plate 44 comes into contact with the upper side wall of the tire T fitted in the upper rim 33u and pushes the upper side wall vertically downward.

The stripper moving mechanism 45 has a screw shaft 46, a rail 46r, a guide 46g, a nut 47, a bearing 48b, a motor 48m, a moving mechanism base 49a, and a cylinder mounting plate 49b. Both the screw shaft 46 and the rail 46r extend in a horizontal direction perpendicular to the axis of rotation Lr of the upper spindle 31u and the lower spindle 31d. In this embodiment, both the screw shaft 46 and the rail 46r extend in the tire conveying direction X which is a horizontal direction. A female screw is formed in the nut 47. The nut 47 is screwed onto the screw shaft 46. The bearing 48b supports the screw shaft 46 such that the screw shaft 46 can rotate around the central axis thereof. The motor 48m rotates the screw shaft 46 around the central axis. Both the motor 48m and the bearing 48b are fixed to the moving mechanism base 49a. The moving mechanism base 49a is fixed to the rim elevator 37 described above. The cylinder mounting plate 49b faces the moving mechanism base 49a while being spaced apart from the moving mechanism base 49a in the vertical direction. The cylinder case 42 of the tire stripper 41 is fixed to the cylinder mounting plate 49b such that the piston rod 43 of the tire stripper 41 advances and retreats in the vertical direction. The cylinder mounting plate 49b is connected to the nut 47 by a nut bracket 49c. The rail 46r and the guide 46g are disposed between the cylinder mounting plate 49b and the moving mechanism base 49a. The rail 46r is fixed to the moving mechanism base 49a. The guide 46g is mounted on the rail 46r so as to be slidable with respect to the rail 46r. The guide 46g is fixed to the cylinder mounting plate 49b.

With the configuration described above, if the motor 48m is driven, so that the screw shaft 46 rotates around the central axis thereof, the nut 47 and the tire stripper connected to the nut 47 move in the horizontal direction.

In this embodiment, the piston rods 43 of the two tire strippers 41 are positioned above the path center line Lc described above. Further, the two tire strippers 41 are disposed at symmetrical positions in the conveying direction X with the axis of rotation Lr of the upper spindle 31u and the lower spindle 31d as the reference. The female screw of the nut 47 connected to a first tire stripper 41u out of the two tire strippers 41 is a reverse screw with respect to the female screw of the nut 47 connected to a second tire stripper 41d. For this reason, if the screw shaft 46 rotates so that the first tire stripper 41u moves in a direction away from the axis of rotation Lr of the upper spindle 31u and the lower spindle 31d, the second tire stripper 41d also moves in a direction away from the axis of rotation Lr. Conversely, if the screw shaft 46 rotates so that the first tire stripper 41u moves in a direction approaching the axis of rotation Lr, the second tire stripper 41d also moves in a direction approaching the axis of rotation Lr. As described above, the two tire strippers 41 move, whereby the side of each of the tires T having different outer diameters can be pushed with the two tire strippers 41.

Figure 6:
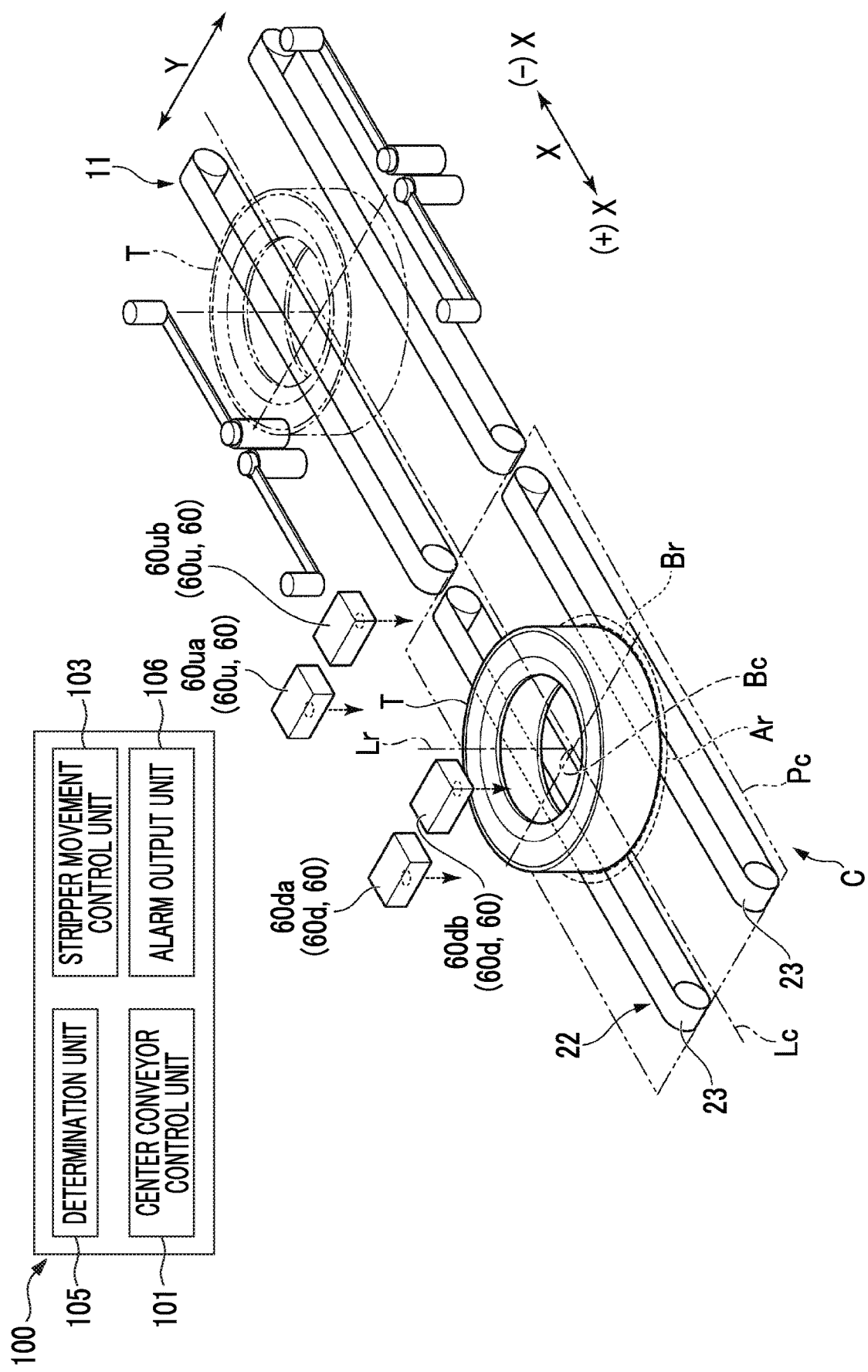
FIG. 6 is a conceptual diagram showing a configuration of a conveying apparatus in the first embodiment of the present invention.
Figure 7:
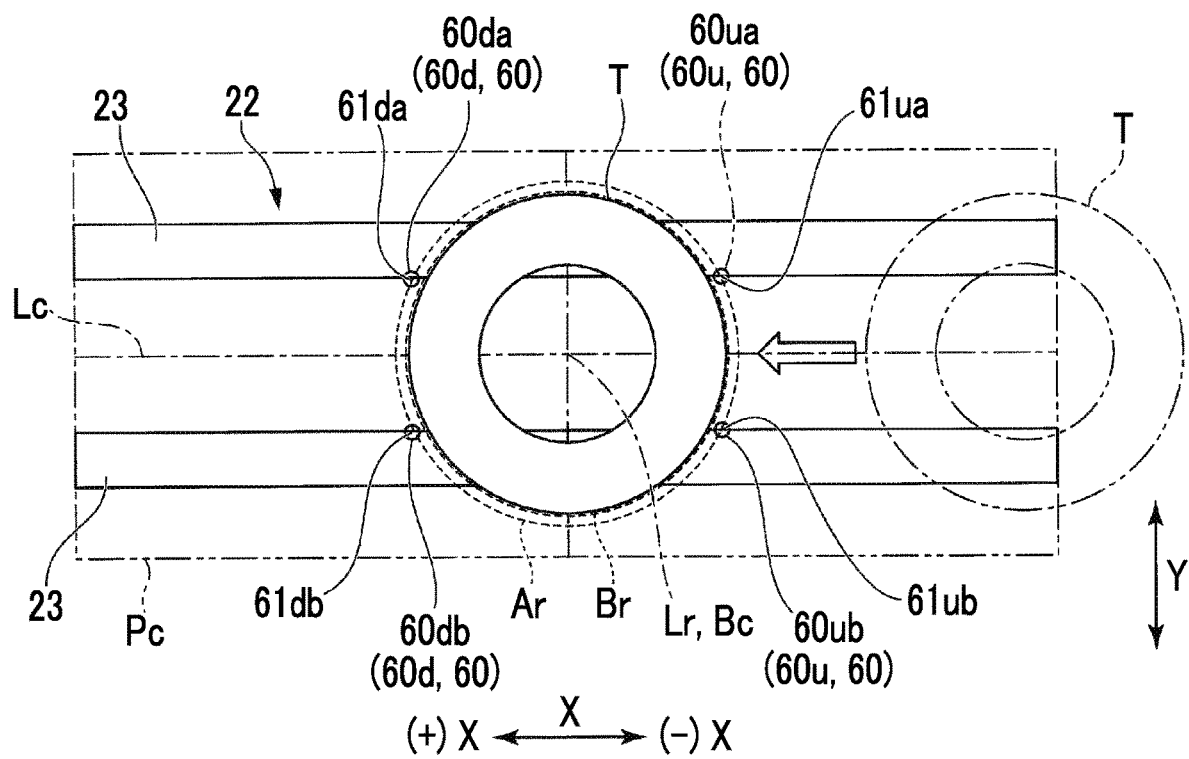
FIG. 7 is an explanatory diagram showing a positional relationship between a center conveyor, a reference area, an allowable area, and a position sensor in the first embodiment of the present invention.

A tire conveying apparatus C of this embodiment is provided with the pre-treatment device 10, the post-treatment device 50, and the center conveyor 22 described above. Further, the tire conveying apparatus C of this embodiment is provided with a position sensor 60, as shown in FIGS. 6 and 7. The position sensor 60 includes an upstream-side position sensor 60u and a downstream-side position sensor 60d. The upstream-side position sensor 60u includes a first upstream-side position sensor 60ua and a second upstream-side position sensor 60ub. The downstream-side position sensor 60d includes a first downstream-side position sensor 60da and a second downstream-side position sensor 60db. That is, the position sensor 60 of this embodiment has the four sensors 60ua, 60ub, 60da, and 60db.

A reference area Br is set in a center conveyance path Pc of the center conveyor 22. The reference area Br is a circular area. A reference center Bc which is the center of the reference area Br is positioned on the axis of rotation Lr of the upper spindle 31u and the lower spindle 31d. The outer diameter of the reference area Br coincides with the outer diameter of the tire T which is an inspection object. An allowable area Ar having an outer diameter larger than the outer diameter of the reference area Br is further set in the center conveyance path Pc with the reference center Bc as the center. The outer diameter of the allowable area Ar is set according to the outer diameter of the reference area Br, in other words, the outer diameter of the tire T.

The first upstream-side position sensor 60ua detects whether or not the tire T is present at an upstream-side first position 61ua of an edge of the allowable area Ar on the upstream side (−)X from the reference center Bc, as shown in FIG. 7. The second upstream-side position sensor 60ub detects whether or not the tire T is present at an upstream-side second position 61ub of the edge of the allowable area Ar on the upstream side (−)X from the reference center Bc. The upstream-side first position 61ua and the upstream-side second position 61ub are positions which are symmetrical in the path width direction Y with the path center line Lc passing through the reference center Bc as the reference.

The first downstream-side position sensor 60da detects whether or not the tire T is present at a downstream-side first position 61da of the edge of the allowable area Ar on the downstream side (+)X from the reference center Bc. The second downstream-side position sensor 60db detects whether or not the tire T is present at a downstream-side second position 61db of the edge of the allowable area Ar on the downstream side (+)X from the reference center Bc. The downstream-side first position 61da and the downstream-side second position 61db are positions which are symmetrical in the path width direction Y with the path center line Lc passing through the reference center Bc as the reference.

Both the first upstream-side position sensor 60ua and the second upstream-side position sensor 60ub are fixed to the cylinder mounting plate 49b, as shown in FIGS. 4 to 6. The first upstream-side position sensor 60ua and the second upstream-side position sensor 60ub are disposed at positions which are symmetrical in the path width direction Y with the piston rod 43 of the first tire stripper 41u positioned on the path center line Lc as the reference.

Both the first downstream-side position sensor 60da and the second downstream-side position sensor 60db are fixed to the cylinder mounting plate 49b. The first downstream-side position sensor 60da and the second downstream-side position sensor 60db are disposed at positions which are symmetrical in the path width direction Y with the piston rod 43 of the second tire stripper 41d positioned on the path center line Lc as the reference.

All the first upstream-side position sensor 60ua, the second upstream-side position sensor 60ub, the first downstream-side position sensor 60da, and the second downstream-side position sensor 60db described above are transmission type laser sensors.

The controller 100 controls the operations of the pre-treatment device 10, the inspection device 20, and the post-treatment device 50, as described above. As shown in FIG. 6, the controller 100 includes a center conveyor control unit (or simply a conveyor control unit) 101 which controls the operation of the center conveyor 22, a stripper movement control unit 103 which controls the operation of the stripper moving mechanism 45, a determination unit 105, and an alarm output unit 106. The operations of the center conveyor control unit 101, the stripper movement control unit 103, the determination unit 105, and the alarm output unit 106 will be described later using the flowchart shown in the drawing.

Next, the operation of the tire inspection system described above will be described.

If the tire T is placed on the inlet conveyor 11, the centering mechanism 12 of the pre-treatment device 10 operates to position the center of the tire T on the center of the inlet conveyance path, in other words, on the path center line Lc. After the centering mechanism 12 is operated, the lubricant application mechanism of the pre-treatment device 10 applies a lubricant to the upper bead portion Tbu and the lower bead portion Tbd of the tire T.

If the application of the lubricant to the tire T is ended, the inlet conveyor 11 and the center conveyor 22 start to be driven, and convey the tire T toward the downstream side (+)X. The center conveyor control unit 101 of the controller 100 determines whether or not the tire T has been conveyed into the reference area Br in the center conveyance path Pc, from the driving amount of the center conveyor 22, the driving time of the center conveyor 22, or the like. If the center conveyor control unit 101 determines that the tire T has been conveyed into the reference area Br in the center conveyance path Pc, the center conveyor control unit 101 stops the center conveyor 22.

If the center conveyor 22 stops, the conveyor elevating device 25 is driven to lower the center conveyor 22 and the tire T placed thereon. The center conveyor 22 is lowered to a position where the upper surface thereof is lower than the lower rim 33d. In this lowering process, the lower bead portion Tbd of the tire T is fitted in the lower rim 33d mounted on the lower spindle 31d, and thus the tire T enters a state of being supported from below by the center conveyor 22 and the lower rim 33d.

Here, when the center conveyor 22 is lowered, the lowering speed of the center conveyor 22 may be made to be slower as the center conveyor 22 comes closer to the lower rim 33d. In this way, it is possible to suppress incorrect positioning of the tire T.

Further, in the process of lowering the center conveyor 22, the lowering of the center conveyor 22 may be temporarily stopped at a timing when the position of the upper surface of the center conveyor 22 and the position of the lower rim 33d substantially coincide with each other in the vertical direction. In this way, even if the tire T tries to swing due to becoming unstable during the lowering, the tire T can be supported by both the lower rim 33d and the center conveyor 22. For this reason, it is possible to suppress the swing of the tire T and reduce the interference of the fitting of the tire T into the lower rim 33d.

Next, the upper spindle 31u and the upper rim 33u mounted on the upper spindle 31u are lowered by the driving of the rim elevator 37. With this lowering, the upper bead portion Tbu of the tire T is fitted in the upper rim 33u. As a result, the tire T is clamped by the upper rim 33u and the lower rim 33d. Further, the lower portion of the upper spindle 31u enters the lower spindle 31d. The upper spindle 31u is combined with the lower spindle 31d by the locking mechanism (not shown) provided in the lower spindle 31d.

Thereafter, air is supplied from the outside to the inside of the tire T through the upper spindle 31u or the lower spindle 31d. If air is supplied to the inside of the tire T, the lower spindle 31d rotates. With the rotation of the lower spindle 31d, the lower rim 33d mounted on the lower spindle 31d, the upper spindle 31u combined with the lower spindle 31d, and the upper rim 33u mounted on the upper spindle 31u rotate integrally with the lower spindle 31d. As a result, the tire T clamped by the upper rim 33u and the lower rim 33d also rotates. During the rotation of the tire T, various measurements relating to the tire T are executed.

If the various measurements are ended, air is extracted from the tire T. Further, the combined state between the upper spindle 31u and the lower spindle 31d by the locking mechanism is released. The upper spindle 31u released from the combined state with the lower spindle 31d is raised by the driving of the rim elevator 37. If the upper spindle 31u is retracted upward, the conveyor elevating device 25 is driven to raise the center conveyor to the upper limit position. The tire T is raised according to the rise of the center conveyor 22. On the other hand, the lower rim 33d, into which the lower bead portion Tbd of the tire T is fitted, does not rise. For this reason, in the process of raising the tire T, the lower rim 33d is removed from the lower bead portion Tbd of the tire T. Thereafter, the plurality of tire strippers 41 are driven, so that the pressing plate 44 of each of the tire strippers 41 comes into contact with the upper side wall of the tire T and pushes the tire T downward. As a result, the upper rim 33u is removed from the upper bead portion Tbu of the tire T. The extraction of the upper rim 33u from the upper bead portion Tbu by the driving of the tire stripper 41 may be performed at the time of the rise of the upper spindle 31u which is performed before the center conveyor 22 is raised. With the above, the upper rim 33u and the lower rim 33d are extracted from the tire T.

If the upper rim 33u and the lower rim 33d are extracted from the tire T, the center conveyor 22 is driven to convey the tire T on the center conveyor 22 toward the downstream side (+)X. As described above, the upper limit position of the center conveyor 22 is a position at which the level of the center conveyance path Pc is the same level as the levels of the inlet conveyance path and the outlet conveyance path. For this reason, the tire T on the center conveyor 22 is transferred from the center conveyor 22 to the outlet conveyor 51. Various types of information such as measurement results are marked on the tire T on the outlet conveyor 51 by a marking mechanism (not shown).

With the above, the operation of the tire inspection system is completed.

Incidentally, if the tire T is conveyed by the inlet conveyor 11 and the center conveyor 22, when the tire T is transferred from the inlet conveyor 11 to the center conveyor 22, there is a case where the tire T is not put at the intended position on the center conveyor 22. Further, when the conveyor is accelerated or decelerated, for example, when the inlet conveyor 11 starts to be driven or when the center conveyor 22 stops, there is a case where the tire T on the conveyor moves relative to the conveyor.

If the center of the tire T greatly deviates from the reference center Bc described above, there is a case where the tire T cannot be held by the upper rim 33u and the lower rim 33d. Further, even if the tire T can be held by the upper rim 33u and the lower rim 33d, there is also a case where the tire T is held in a state of being inclined with respect to the horizontal direction. For this reason, when the tire T which has been conveyed by the center conveyor 22 is held by the upper rim 33u and the lower rim 33d, the center of the tire T needs to be positioned substantially at the reference center Bc.

Therefore, in this embodiment, a tire conveying method which adjusts the position of the tire T on the center conveyor 22 is executed. Hereinafter, the tire conveying method will be described according to the flowchart shown in the drawing.

As described above, if a lubricant is applied to the upper bead portion Tbu and the lower bead portion Tbd of the tire T by the lubricant application mechanism of the pre-treatment device 10, the inlet conveyor 11 and the center conveyor 22 start to be driven and convey the tire T toward the downstream side (+)X (S1: conveyor drive start). The center conveyor control unit 101 of the controller 100 determines whether or not the tire T has been conveyed into the reference area Br, from the driving amount of the center conveyor 22, the driving time of the center conveyor 22, or the like, as described above. When the center conveyor control unit 101 determines that the tire T has been conveyed into the reference area Br, the center conveyor control unit 101 stops the center conveyor 22. In other words, if, by the center conveyor control unit 101, it is assumed that the tire T has been conveyed to the reference area Br, the center conveyor 22 stops (S2: conveyor stop).

If the center conveyor 22 stops, the position sensor detects the position of the tire T on the center conveyor 22 (S3: position detection step). The size of the tire T is input from the outside to the controller 100. The stripper movement control unit 103 determines the outer diameter of the reference area Br and the outer diameter of the allowable area Ar according to the size of the tire T. The stripper movement control unit 103 operates the stripper moving mechanism 45 such that the respective sensors 60*ua*, 60*ub*, 60*da*, and 60*db* are positioned at positions vertically above the edge of the allowable area Ar which is determined according to the size of the tire T. As a result, the first upstream-side position sensor 60*ua* is positioned vertically above the upstream-side first position 61*ua* of the edge of the allowable area Ar on the upstream side (−)X from the reference center Bc. The second upstream-side position sensor 60*ub* is positioned vertically above the upstream-side second position 61*ub* of the edge of the allowable area Ar on the upstream side (−)X from the reference center Bc. The first downstream-side position sensor 60*da* is positioned vertically above the downstream-side first position 61*da* of the edge of the allowable area Ar on the downstream side (+)X from the reference center Bc. The second downstream-side position sensor 60*db* is positioned vertically above the downstream-side second position 61*db* of the edge of the allowable area Ar on the downstream side (+)X from the reference center Bc. If the respective sensors 60*ua*, 60*ub*, 60*da*, and 60*db* are positioned at predetermined positions, whether or not the tire T is present is detected by the respective sensors 60*ua*, 60*ub*, 60*da*, and 60*db*. The operation of the stripper moving mechanism 45 may be executed at any time as long as it is before the respective sensor 60*ua*, 60*ub*, 60*da*, and 60*db* actually detect the presence or absence of the tire T. For example, when the tire T is present in the pre-treatment device 10, the stripper moving mechanism 45 may be operated.

Figure 11:
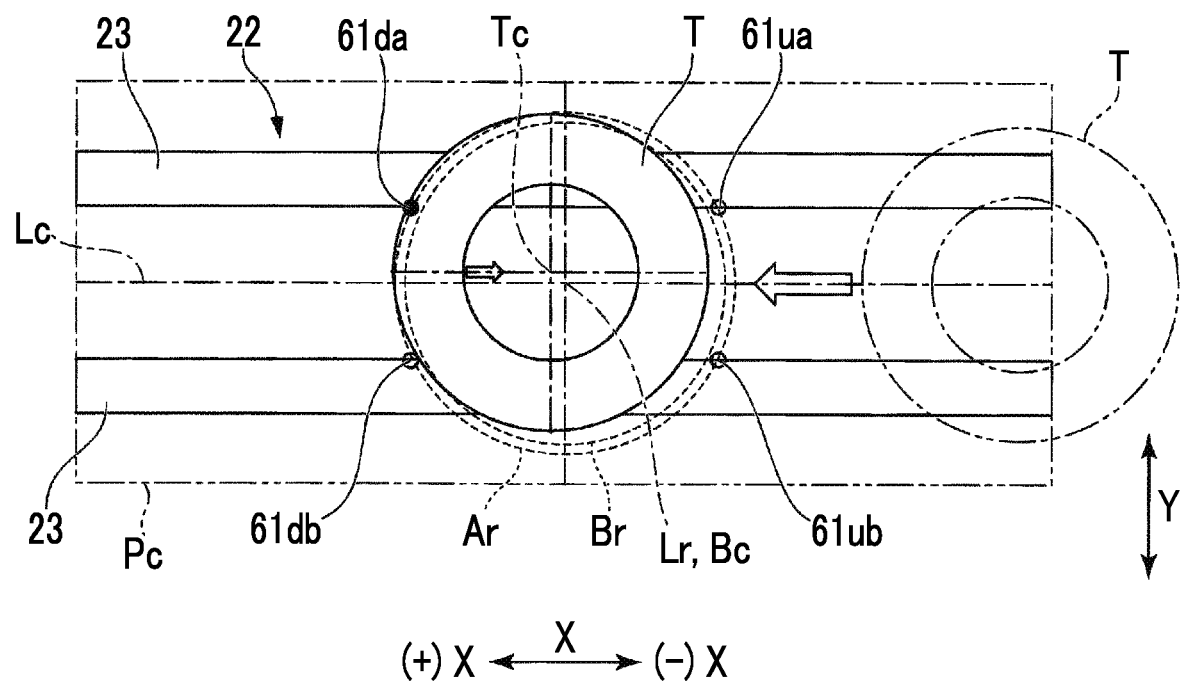
FIG. 11 is an explanatory diagram showing an adjustment method in a case where the tire deviates toward the upstream side and slightly deviates in a path width direction from the allowable area in the first embodiment of the present invention.

The determination unit 105 determines whether or not the position of the tire T is present within the allowable area Ar, based on the detection results at the respective sensors 60*ua*, 60*ub*, 60*da*, and 60*db* (S4: position determination step). For example, as shown in FIG. 7, in a case where the tire T is present within the allowable area Ar, the determination unit 105 receives signals indicating "Absence" to the effect that the tire T is not present, from all the sensors 60*ua*, 60*ub*, 60*da*, and 60*db*, as shown in FIG. 9. In this case, the determination unit 105 determines that the tire T is present "within the allowable area", based on the signals from the respective sensors 60*ua*, 60*ub*, 60*da*, and 60*db*. Further, as shown in FIG. 10 or 11, in a case where the portion on the downstream side (+)X of the tire T is present outside the allowable area Ar, the determination unit 105 receives a signal indicating "Presence" to the effect that the tire T is present, from at least one downstream-side position sensor 60*d* of the first downstream-side position sensor 60*da* and the second downstream-side position sensor 60*db*, as shown in FIG. 9. In this case, the determination unit 105 determines that the "downstream-side portion" of the tire T is present "outside the allowable area", based on the signals from the respective sensors 60*ua*, 60*ub*, 60*da*, and 60*db*. Further, if the determination unit 105 receives a signal indicating "Presence" to the effect that the tire T is present, from at least one upstream-side position sensor 60*u* of the first upstream-side position sensor 60*ua* and the second upstream-side position sensor 60*ub*, the determination unit 105 determines that the "upstream-side portion" of the tire T is present "outside the allowable area".

If the determination unit 105 determines that the tire T is present within the allowable area Ar, the tire T is handled as having been conveyed to the reference area Br and the tire conveyance is ended. If the tire conveyance to the reference area Br is ended, the tire T is clamped by the upper rim 33*u* and the lower rim 33*d*, as described above, and various measurements relating to the tire T are executed.

On the other hand, if the determination unit 105 determines that at least a portion of the tire T is present outside the allowable area Ar, the determination unit 105 determines whether or not a position adjustment step (S6) (described later) has been executed with respect to the tire T (S5: adjustment presence or absence determination step). If the determination unit 105 determines that the position adjustment step (S6) has not been executed with respect to the tire T, the center conveyor control unit 101 drives the center conveyor 22 to adjust the position of the tire T (S6: tire position adjustment step).

In the tire position adjustment step (S6), for example, when a determination that the "downstream-side portion" of the tire T is present "outside the allowable area" is made in the position determination step (S4), as shown in FIG. 9, the center conveyor control unit 101 drives the center conveyor 22 to slightly convey the tire T on the center conveyor 22 toward the upstream side (−)X. Further, for example, if a determination that the "upstream-side portion" of the tire T is present "outside the allowable area" is made in the position determination step (S4), as shown in FIG. 9, the center conveyor control unit 101 drives the center conveyor 22 to slightly convey the tire T on the center conveyor 22 toward the downstream side (+)X. The slight drive amount of the center conveyor 22 is, for example, the amount of movement of the tire T by a distance corresponding to ½ of the difference between the outer diameter of the allowable area Ar and the outer diameter of the reference area Br.

If the tire T is slightly conveyed by the driving of the center conveyor 22, the position sensor 60 detects the position of the tire T on the center conveyor 22 again (S3: position detection step). Subsequently, the determination unit 105 determines whether or not the position of the tire T is present within the allowable area Ar, based on the detection results of the respective sensors 60*ua*, 60*ub*, 60*da*, and 60*db* (S4: position determination step). If the determination unit 105 determines that the position of the tire T is present within the allowable area Ar, based on the detection results of the respective sensors 60*ua*, 60*ub*, 60*da*, and 60*db*, the tire conveyance to the reference area Br is ended. On the other hand, if the determination unit 105 determines that at least a portion of the tire T is present outside the allowable area Ar, based on the detection results of the respective sensors 60*ua*, 60*ub*, 60*da*, and 60*db*, the determination unit 105 determines whether or not the tire position adjustment step (S6) has been executed with respect to the tire T (S5: adjustment presence or absence determination step). In this case, since the tire position adjustment step (S6) has been already executed with respect to the tire T, the determination unit 105 determines that the tire position adjustment step (S6) has been executed with respect to this tire T.

If the determination unit 105 determines that the tire position adjustment step (S6) has been executed with respect to the tire T, the alarm output unit 106 outputs an alarm to the effect that the tire position is defective (S7: alarm output step). If this alarm is output, an operator temporarily stops, for example, the operation of the tire inspection system and adjusts the position of the tire T on the center conveyor 22 in person.

As shown in FIG. 11, in a case where the tire T has deviated in the tire conveying direction X from the reference area Br and slightly deviated in the path width direction Y from the reference area Br, if the center conveyor 22 is driven in the tire position adjustment step (S6), it is possible to position the tire T within the allowable area Ar. However, as shown in (a) of FIG. 12, in a case where the tire T has greatly deviated in the path width direction Y from the reference area Br, even if the center conveyor 22 is driven in the tire position adjustment step (S6), as shown in (b) of FIG. 12, there is a case where it is not possible to position the tire T within the allowable area Ar. In this embodiment, in such a case, the alarm output step (S7) is executed.

As described above, in this embodiment, the position of the tire T on the center conveyor 22 is detected at a position where it is assumed that the tire T has been conveyed to the reference area Br by the center conveyor 22. Then, whether or not the tire T is positioned within the allowable area Ar for the reference area Br is determined, and in a case where the tire T is not positioned within the allowable area Ar, the center conveyor 22 is driven to adjust the position of the tire T. Accordingly, in this embodiment, it is possible to position the position of the tire T within the allowable area Ar, and as a result, it is possible to reduce a frequency at which the tire T cannot be held by the upper rim 33$u$ and the lower rim 33$d$. Further, in this embodiment, since the tire T can be accurately fitted into the upper rim 33$u$ and the lower rim 33$d$, it is possible to accurately measure the tire T.

Further, in this embodiment, instead of a configuration in which a pair of guides is provided and the position of the tire T is adjusted by driving the pair of guides, as in the related art, the position of the tire T is adjusted by driving the existing conveyor. For this reason, in this embodiment, the apparatus cost can be suppressed.

In the above, after the center conveyor 22 is slightly driven in the tire position adjustment step (S6), the position detection step (S3) is executed. However, the position detection step (S3) may be executed while slightly driving the center conveyor 22.

Second Embodiment

A second embodiment of the tire inspection system according to the present invention will be described with reference to FIGS. 13 and 14.

The hardware configuration of the tire inspection system of this embodiment is the same as that of the tire inspection system of the first embodiment. On the other hand, the software configuration of the tire inspection system of this embodiment is different from that of the tire inspection system of the first embodiment.

The controller 100 of the tire conveying apparatus C in the first embodiment has the center conveyor control unit 101, the stripper movement control unit 103, the determination unit 105, and the alarm output unit 106. As shown in FIG. 13, a controller 100$a$ of a tire conveying apparatus Ca in this embodiment has a center conveyor control unit 101$a$, the stripper movement control unit 103, the determination unit 105, an inlet conveyor control unit 102 which controls the operation of the inlet conveyor 11, and a centering control unit 104 which controls the operation of the centering mechanism 12.

Next, a tire conveying method in this embodiment will be described according to the flowchart shown in FIG. 14.

Also in this embodiment, similar to the first embodiment, the conveyor drive start (S1), the conveyor stop (S2), the position detection step (S3), the position determination step (S4), the adjustment presence or absence determination step (S5), and the tire position adjustment step (S6) are executed.

In the first embodiment, after the tire position adjustment step (S6), the position detection step (S3), the position determination step (S4), and the adjustment presence or absence determination step (S5) are executed, and if a determination that the position adjustment step (S6) has been executed with respect to the tire T is made in the adjustment presence or absence determination step (S5), the alarm output step (S7) is executed.

On the other hand, in this embodiment, if a determination that the position adjustment step (S6) has been executed with respect to the tire T is made in the adjustment presence or absence determination step (S5), instead of the alarm output step (S7), a center conveyor reverse rotation drive step (S8), an inlet conveyor reverse rotation drive step (S9), and a centering step (S10) are executed, as shown in the flowchart of FIG. 14.

In this embodiment, if a determination that the position adjustment step (S6) has been executed with respect to the tire T is made in the adjustment presence or absence determination step (S5), the center conveyor control unit 101$a$ instructs the center conveyor 22 to perform reverse rotation drive (S8: center conveyor reverse rotation drive step), and the inlet conveyor control unit 102 instructs the inlet conveyor 11 to perform reverse rotation drive (S9: inlet conveyor reverse rotation drive step). As a result, the tire T on the center conveyor 22 is conveyed toward the upstream side (−)X by the reverse rotation drive of the center conveyor 22 and transferred to the inlet conveyor 11. The tire T which has been transferred to the inlet conveyor 11 is further conveyed toward the upstream side (−)X by the reverse rotation drive of the inlet conveyor 11. If the tire T is conveyed to the position where it can be centered by the centering mechanism 12 of the pre-treatment device 10, the center conveyor 22 and the inlet conveyor 11 are stopped.

If the center conveyor 22 and the inlet conveyor 11 are stopped, the centering mechanism 12 is driven by an instruction from the centering control unit 104 to execute the centering of the tire T on the inlet conveyor 11 such that the center of the tire T is positioned on the path center line Lc (S10: centering step).

If the centering step (S10) is executed, the processing returns to step S1, and step S1 and the subsequent processing are executed.

In the first embodiment, as described using FIG. 12, in a case where the tire T has greatly deviated from the reference area Br in the path width direction Y, even if the center conveyor 22 is driven in the tire position adjustment step (S6), there is a case where it is not possible to position the tire T within the allowable area Ar. In this embodiment, in such a case, the tire T is returned to the pre-treatment device 10, and the tire T is centered by the centering mechanism 12 of the pre-treatment device 10. Accordingly, in this embodiment, even in a case where the tire T has deviated from the reference area Br in the path width direction Y, it is possible to position the tire T within the allowable area Ar.

[Modification Example]

The present invention is not limited to each of the embodiments described above and includes various modifications added to the above-described embodiments within a scope which does not depart from the gist of the present invention. That is, the specific shapes, configurations, or the like described in each embodiment are merely examples and can be appropriately changed.

As long as the position sensor 60 can detect whether or not the tire T is positioned within the allowable area Ar, it is not necessary to dispose a plurality of sensors, as in the above embodiments. For example, as shown in FIG. 15, only one upstream-side position sensor 60u and only one downstream-side position sensor 60d may be disposed. Also in this case, in order to cope with a change in tire size, it is preferable to mount the respective position sensors 60u and 60d on the tire stripper 41. Further, in this case, position sensors 60c and 60c for detecting a position on an imaginary line passing through the reference center Bc and extending in the path width direction Y may be added. In this case, in order to cope with a change in tire size, for example, it is preferable that a bracket 29 is mounted on a conveyor frame that supports the belt 23 on one side out of the pair of belts configuring the center conveyor 22 and the position sensor 60c is mounted on the bracket 29.

Each of the plurality of position sensors in the above embodiments is a transmission type laser sensor. However, these sensors may be of a reflection type, for example. Further, the sensor may be a sensor for measuring a distance. That is, one or more sensors configuring the position sensor may be any sensor as long as it can detect whether or not the tire T is positioned within the allowable area Ar.

The tire stripper 41 in the above embodiments is an air cylinder. However, the tire stripper 41 may be configured of any device as long as it has a driving end that linearly moves, as in a linear actuator, for example.

The stripper moving mechanism 45 in the above embodiments moves the tire stripper 41 in the horizontal direction and in a direction parallel to the path center line Lc. However, the stripper moving mechanism 45 may move the tire stripper 41 in the horizontal direction and in a direction twisted with respect to the path center line Lc. However, in this case, since the position sensor detects the deviation of the tire T in the tire conveying direction X from the allowable area Ar, it is necessary for the movement direction of the tire stripper 41 to include a component in the tire conveying direction X.

In each of the embodiments described above, the center conveyor 22 is moved relative to the lower rim 33d by lowering the center conveyor 22. However, the center conveyor 22 may be moved relative to the lower rim 33d by raising to the lower rim 33d, for example.

Further, in each of the embodiments described above, after the tire T is first deposited on the lower rim 33d, the upper rim 33u is lowered, so that the tire T is clamped by the upper rim 33u and the lower rim 33d. However, the tire T may be clamped by the upper rim 33u and the lower rim 33d by bringing the lower rim 33d closer to the tire T after the tire T is first deposited on the upper rim 33u. That is, the configuration of the tire holder in the present invention is not limited to the configuration of the tire holder 30 in the above embodiments.

Further, the tire conveying apparatuses C and Ca of each of the embodiments described above are apparatuses which are applied to the tire inspection system. However, the tire conveying apparatus according to the present invention may not be applied to the tire inspection system.

INDUSTRIAL APPLICABILITY

According to an aspect of the present invention, it is possible to dispose a tire within an allowable area for the intended area while suppressing the apparatus cost.

REFERENCE SIGNS LIST

10: pre-treatment device
11: inlet conveyor
12: centering mechanism
20: inspection device
21: frame
21a: base
21b: main frame
22: center conveyor
23: belt
24: belt opening and closing mechanism
25: conveyor elevating device
25a: guide means
29: bracket
30: tire holder
31u: upper spindle
31d: lower spindle
32u: upper rim chuck mechanism
32d: lower rim chuck mechanism
33u: upper rim
33d: lower rim
37: rim elevator
39: tire measuring instrument
41: tire stripper
41u: first tire stripper
41d: second tire stripper
42: cylinder case
43: piston rod
44: pressing plate
45: stripper moving mechanism
46: screw shaft
46r: rail
46g: guide
47: nut
48b: bearing
48m: motor
49a: moving mechanism base
49b: cylinder mounting plate
50: post-treatment device
51: outlet conveyor
60 position sensor
60u: upstream-side position sensor
60ua: first upstream-side position sensor
600ub: second upstream-side position sensor
60d: downstream-side position sensor
60da: first downstream-side position sensor
60db: second downstream-side position sensor
100, 100a: controller
101, 101a: center conveyor control unit
102: inlet conveyor control unit
103: stripper movement control unit 104: centering control unit
105: determination unit
106: alarm output unit
C, C tire conveying apparatus
T: tire
Tbu: upper bead portion
Tbd: lower bead portion
Twu: upper side wall
Twd: lower side wall
Pc: center conveyance path
Lc: path center line
Br: reference area
Bc: reference center
Ar: allowable area
Lr: axis of rotation
X: tire conveying direction
(−)X: upstream side
(+)X: downstream side
Y: path width direction

The invention claimed is:

1. A tire conveying apparatus comprising:
a conveyor on which a tire that is in a state where both side walls thereof face a vertical direction is placed, and which is capable of conveying the tire in a predetermined tire conveying direction;
a position sensor which is provided around a reference area set in a conveyance path of the conveyor and detects a position of the tire on the conveyor; and
a controller which controls the conveyor,
wherein the controller includes a determination unit which determines whether or not the tire is positioned within an allowable area for the reference area, based on a detection result of the position sensor, and a conveyor control unit which drives the conveyor such that the tire is positioned within the allowable area if the determination unit determines that the tire is not positioned within the allowable area,
wherein the reference area is a circular area having an outer shape matching an outer diameter of the tire, and
wherein the allowable area is a circular area having an outer diameter larger than the outer diameter of the tire and having a reference center that is a center of the reference area as a center.

2. The tire conveying apparatus according to claim 1, wherein the determination unit determines again whether or not the tire is positioned within the allowable area, based on a detection result of the position sensor after the conveyor control unit has driven the conveyor such that the tire is positioned within the allowable area.

3. The tire conveying apparatus according to claim 1, wherein
the position sensor includes an upstream-side position sensor which detects whether or not the tire is present at a position of an edge of the allowable area on the upstream side in the tire conveying direction from the reference center, and a downstream-side position sensor which detects whether or not the tire is present at a position of an edge of the allowable area on the downstream side in the tire conveying direction from the reference center, and
the determination unit determines that the tire is positioned within the allowable area, if absence of the tire is detected by the upstream-side position sensor and the downstream-side position sensor, and determines that the tire is not positioned within the allowable area, if any one of the upstream-side position sensor and the downstream-side position sensor detects presence of the tire.

4. The tire conveying apparatus according to claim 3, wherein the upstream-side position sensor includes a first upstream-side position sensor which detects whether or not the tire is present at an upstream-side first position of the edge of the allowable area on the upstream side in the tire conveying direction from the reference center, and a second upstream-side position sensor which detects whether or not the tire is present at an upstream-side second position of the edge of the allowable area on the upstream side in the tire conveying direction from the reference center,
the upstream-side second position is different from the upstream-side first position in position in a path width direction of the conveyance path,
the downstream-side position sensor includes a first downstream-side position sensor which detects whether or not the tire is present at a downstream-side first position of the edge of the allowable area on the downstream side in the tire conveying direction from the reference center, and a second downstream-side position sensor which detects whether or not the tire is present at a downstream-side second position of the edge of the allowable area on the downstream side in the tire conveying direction from the reference center, and
the downstream-side second position is different from the downstream-side first position in position in the path width direction.

5. The tire conveying apparatus according to claim 4, wherein the upstream-side first position and the downstream-side first position are present on a first side in the path width direction from the reference center, and
the upstream-side second position and the downstream-side second position are present on a second side opposite to the first side in the path width direction from the reference center.

6. The tire conveying apparatus according to claim 3, further comprising:
an inlet conveyor which is disposed on the upstream side in the tire conveying direction from the conveyor, and on which a tire that is in a state where both side walls thereof face a vertical direction is placed, and which conveys the tire toward the downstream side in the tire conveying direction to transfer the tire to the conveyor; and
a centering mechanism which causes the center of the tire placed on the inlet conveyor to be positioned on a path center line passing through the reference center and extending in the tire conveying direction,
wherein the controller includes an inlet conveyor control unit which controls an operation of the inlet conveyor, and a centering control unit which controls an operation of the centering mechanism,
the conveyor control unit causes the conveyor to convey the tire toward the upstream side in the tire conveying direction to transfer the tire to the inlet conveyor, if the determination unit determines that the tire is not positioned within the allowable area, after completion of a tire position adjustment step of driving the conveyor with an instruction from the conveyor control unit,
the inlet conveyor control unit causes the inlet conveyor to convey the tire toward the upstream side in the tire conveying direction to an adjustable position where the position of the tire can be adjusted by the centering mechanism, if the tire moves from the conveyor to the inlet conveyor, and the centering control unit causes the centering mechanism to position the center of the tire on the path center line, if the tire reaches the adjustable position by the inlet conveyor.

7. The tire conveying apparatus according to claim 1,
wherein the controller includes an alarm output unit which outputs an alarm to the effect that a tire position is defective, if the determination unit determines that the tire is not positioned within the allowable area, after completion of a tire position adjustment step of driving the conveyor with an instruction from the conveyor control unit.

8. A tire inspection system comprising:
the tire conveying apparatus according to claim 3; and
an inspection device which holds the tire which has been conveyed into the allowable area and performs an inspection on the tire,
wherein the inspection device includes a plurality of tire strippers which are disposed on an axis passing through the reference center and extending in a vertical direction and move the tire in the vertical direction relative to a rim fitted in a bead portion of the tire, and a stripper moving mechanism which moves the plurality of tire strippers in a radial direction with respect to the axis,
the upstream-side position sensor is mounted on any one tire stripper among the plurality of tire strippers, and the downstream-side position sensor is mounted on any other tire stripper among the plurality of tire strippers,
the controller includes a stripper movement control unit which controls an operation of the stripper moving mechanism, and
the stripper movement control unit determines an outer diameter of the allowable area according to an outer diameter of the tire that is an inspection object, and causes a tire stripper with the upstream-side position sensor mounted thereon and a tire stripper with the downstream-side position sensor mounted thereon to be positioned at positions where the upstream-side position sensor and the downstream-side position sensor can detect whether or not the tire is present at a position of an edge of the allowable area.

9. A tire conveying method of placing a tire that is in a state where both side walls thereof face a vertical direction and conveying the tire in a predetermined tire conveying direction with a conveyor, the tire conveying method comprising:
a position detection step of detecting a position of the tire on the conveyor at a position where it is assumed that the tire has been conveyed to a reference area set in a conveyance path of the conveyor by the conveyor;
a position determination step of determining whether or not the tire is positioned within an allowable area for the reference area, based on a detection result in the position detection step; and
a tire position adjustment step of adjusting the position of the tire by driving the conveyor such that the tire is positioned within the allowable area, if a determination that the tire is not positioned within the allowable area is made in the position determination step,
wherein the reference area is a circular area having an outer shape matching an outer diameter of the tire, and
wherein the allowable area is a circular area having an outer diameter larger than the outer diameter of the tire and having a reference center that is a center of the reference area as a center.

10. The tire conveying method according to claim 9,
wherein the position detection step and the position determination step are executed again after execution of the tire position adjustment step.

11. The tire conveying method according to claim 9,
wherein the position detection step and the position determination step are executed again after execution of the tire position adjustment step, and
an alarm output step of outputting an alarm to the effect that a tire position is defective is executed if a determination that the tire is not positioned within the allowable area is made in the position determination step after the tire position adjustment step.

12. The tire conveying method according to claim 9,
wherein the position detection step and the position determination step are executed again after execution of the tire position adjustment step, and
a reverse rotation drive step of driving the conveyor in reverse rotation to convey the tire on the conveyor toward the upstream side is executed if a determination that the tire is not positioned within the allowable area is made in the position determination step after the tire position adjustment step.

* * * * *